(12) United States Patent
Yu et al.

(10) Patent No.: US 12,222,994 B2
(45) Date of Patent: Feb. 11, 2025

(54) QUICK APPLICATION STARTUP METHOD AND RELATED APPARATUS

(71) Applicant: Huawei Technologies Co., Ltd., Shenzhen (CN)

(72) Inventors: Litao Yu, Shenzhen (CN); Yonghui Wu, Hangzhou (CN); Fei Sun, Hangzhou (CN); Guoqiang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 17/763,842

(22) PCT Filed: Aug. 29, 2020

(86) PCT No.: PCT/CN2020/112300
§ 371 (c)(1),
(2) Date: Mar. 25, 2022

(87) PCT Pub. No.: WO2021/057390
PCT Pub. Date: Apr. 1, 2021

(65) Prior Publication Data
US 2022/0292141 A1  Sep. 15, 2022

(30) Foreign Application Priority Data
Sep. 26, 2019  (CN) .......................... 201910919851.9

(51) Int. Cl.
*G06F 16/951* (2019.01)
*G06F 8/41* (2018.01)
(Continued)

(52) U.S. Cl.
CPC ............ *G06F 16/951* (2019.01); *G06F 8/427* (2013.01); *G06F 16/9566* (2019.01); *G06F 16/957* (2019.01); *H04L 51/046* (2013.01)

(58) Field of Classification Search
CPC .... G06F 16/951; G06F 8/427; G06F 16/9566; G06F 16/957; H04L 51/046
(Continued)

(56) References Cited

U.S. PATENT DOCUMENTS 6,243,750 B1 * 6/2001 Verma .................... G06Q 30/02
709/224
7,818,721 B2  10/2010 Sundararajan et al.
(Continued)

FOREIGN PATENT DOCUMENTS

CN  101201827 A  6/2008
CN  102597993 A  7/2012
(Continued)

*Primary Examiner* — Kuen S Lu
(74) *Attorney, Agent, or Firm* — Slater Matsil, LLP

(57) ABSTRACT

A quick application startup method and a related apparatus are provided. The method includes: An electronic device requests an acceleration script of one or more quick applications from an application server. A first operation for a target quick application is detected. In response to the first operation, the electronic device requests an application package of the target quick application from the application server. An acceleration script of the target quick application is included in the acceleration script of the one or more quick applications. In response to the first operation, the electronic device runs the acceleration script of the target quick application to obtain a first URL, and obtains first data based on the first URL. The electronic device may generate and display a first screen of the target quick application based on the first data.

17 Claims, 16 Drawing Sheets

(51) Int. Cl.
*G06F 16/955* (2019.01)
*G06F 16/957* (2019.01)
*H04L 51/046* (2022.01)

(58) Field of Classification Search
USPC ........................................................ 707/722
See application file for complete search history.

(56) References Cited

U.S. PATENT DOCUMENTS

| | | | |
|---|---|---|---|
| 8,849,957 | B1 | 9/2014 | Boodman et al. |
| 10,069,832 | B2 | 9/2018 | Diep et al. |
| 2002/0002463 | A1* | 1/2002 | Kroeker ................. G10L 15/30 |
| | | | 704/E15.047 |
| 2003/0061515 | A1* | 3/2003 | Kindberg .............. H04L 63/029 |
| | | | 726/4 |
| 2004/0153558 | A1* | 8/2004 | Gunduc ................ G06F 9/5055 |
| | | | 709/229 |
| 2009/0077471 | A1* | 3/2009 | Lahr ..................... G06F 3/0482 |
| | | | 715/748 |
| 2010/0269096 | A1 | 10/2010 | Araya et al. |
| 2011/0246547 | A1 | 10/2011 | Duggal et al. |
| 2015/0016675 | A1 | 1/2015 | Kishi |
| 2015/0358478 | A1 | 12/2015 | Arazi et al. |
| 2016/0165065 | A1* | 6/2016 | Damstra ................ H04M 15/43 |
| | | | 455/408 |
| 2016/0335231 | A1 | 11/2016 | Hu et al. |
| 2016/0337426 | A1* | 11/2016 | Shribman ............. H04L 65/612 |
| 2017/0255457 | A1 | 9/2017 | Falkenburg et al. |
| 2019/0251188 | A1 | 8/2019 | Luo |
| 2020/0026554 | A1* | 1/2020 | Kogure ................. G06F 21/608 |
| 2021/0191996 | A1 | 6/2021 | Li |

FOREIGN PATENT DOCUMENTS

| | | | |
|---|---|---|---|
| CN | 103198113 | A | 7/2013 |
| CN | 104202403 | A | 12/2014 |
| CN | 106202100 | A | 12/2016 |
| CN | 106445809 | A | 2/2017 |
| CN | 106453094 | A | 2/2017 |
| CN | 108228305 | A | 6/2018 |
| CN | 108804514 | A | 11/2018 |
| CN | 108804707 | A | 11/2018 |
| CN | 108846100 | A | 11/2018 |
| CN | 109271779 | A | 1/2019 |
| CN | 109284144 | A | 1/2019 |
| CN | 109388453 | A | 2/2019 |
| CN | 109408136 | A | 3/2019 |
| CN | 109408150 | A | 3/2019 |
| CN | 109814930 | A | 5/2019 |
| CN | 109885302 | A | 6/2019 |
| CN | 109885355 | A | 6/2019 |
| CN | 110083467 | A | 8/2019 |
| CN | 110187913 | A | 8/2019 |
| JP | 2015534144 | A | 11/2015 |
| WO | 2015078566 | A1 | 6/2015 |

\* cited by examiner

QUICK APPLICATION STARTUP METHOD AND RELATED APPARATUS

CROSS-REFERENCE TO RELATED APPLICATIONS

This application is a national stage of International Application No. PCT/CN2020/112300, filed on Aug. 29, 2020, which claims priority to Chinese Patent Application No. 201910919851.9, filed on Sep. 26, 2019. Both of the aforementioned applications are hereby incorporated by reference in their entireties.

TECHNICAL FIELD

This application relates to the field of electronic technologies, and in particular, to a quick application startup method and a related apparatus.

BACKGROUND

A quick application is an application that does not need to be installed in advance and that is downloaded immediately when a user needs to use the quick application. Before the quick application is used for the first time, an application package needs to be downloaded. In a process from tapping the quick application to completing rendering of a first screen (an initial interface displayed when an application is started), the application package needs to be downloaded, and data required for first screen display needs to be requested (for example, a news application needs to request data such as a news list from a third-party server). Because a uniform resource locator (uniform resource locator, URL) corresponding to the data required for the first screen display of the quick application needs to be obtained by parsing the application package, it takes a long time to start the quick application for the first time.

In the conventional technology, to reduce the time for starting the quick application for the first time, a list of URLs corresponding to the data required for the first screen display in a quick application startup process is usually manually pre-stored in an application server. After an engine that runs quick applications is started, the engine obtains a list of URLs corresponding to all the quick applications from the application server. After a user taps a quick application for the first time, the engine may obtain data required by the quick application from a third-party server based on a URL corresponding to the quick application while a mobile phone downloads an application package, to reduce time for starting the quick application. This manner of pre-storing a URL list needs to be manually maintained, which is likely to cause a problem that an obtained URL is incorrect.

SUMMARY

This application provides a quick application startup method and a related apparatus, to improve quick application startup efficiency.

According to a first aspect, an embodiment of this application provides a quick application startup method. The method includes: An electronic device sends a first request to an application server, where the first request is used to indicate the application server to send an acceleration script of one or more quick applications to the electronic device; the electronic device receives the acceleration script that is of the one or more quick applications and that is sent by the application server; a first operation for a target quick application is detected, and in response to the first operation, the electronic device sends a second request to the application server, where the second request is used to request an application package of the target quick application, and an acceleration script of the target quick application is included in the acceleration script of the one or more quick applications; in response to the first operation, the electronic device runs the acceleration script of the target quick application to obtain a first uniform resource locator URL, and obtain first data from a third-party server based on the first URL; the electronic device receives the application package that is of the target quick application and that is sent by the application server; the electronic device runs the application package of the target quick application to obtain a second URL; and when the first URL is the same as the second URL, the electronic device generates and displays a first screen of the target quick application based on the first data.

In some embodiments, before that an electronic device sends a first request to an application server, the method further includes: The electronic device receives instant messaging information that includes the one or more quick applications.

In some embodiments, before that an electronic device sends a first request to an application server, the method further includes: The electronic device detects a user operation performed on an icon of the one or more quick applications.

In some embodiments, before that an electronic device sends a first request to an application server, the method further includes: The electronic device receives entered quick application name information. There is a correspondence between the quick application name information and the one or more quick applications.

In some embodiments, the method further includes: When the first URL is different from the second URL, the electronic device obtains second data from the third-party server based on the second URL; and the electronic device generates and displays the first screen of the target quick application based on the second data.

In some embodiments, the method further includes: When the first URL is the same as the second URL, the electronic device sends, to the application server, information indicating that the acceleration script of the target quick application is successfully hit; or when the first URL is different from the second URL, the electronic device sends, to the application server, information indicating that the acceleration script of the target quick application fails to be hit.

In some embodiments, that the electronic device runs the acceleration script of the target quick application to obtain a first uniform resource locator URL includes: The electronic device obtains device data based on the acceleration script of the target quick application, where the device data includes one or more of a media access control MAC address, an engine version number, an Internet protocol IP address, an operating system version, address information, a network type, and a manufacturer brand of the electronic device; and the electronic device obtains the first URL based on the acceleration script of the target quick application and the device data.

According to a second aspect, an embodiment of this application provides a quick application startup method. The method includes: An application server receives an application package of a quick application; the application server generates an acceleration script of the quick application based on the application package; the application server receives a first request sent by a first electronic device, where the first request is used to indicate the application server to send the acceleration script of the quick application to the first electronic device; and the application server sends the acceleration script of the quick application to the first electronic device based on the first request.

In some embodiments, the method further includes: The application server receives a hit result that is of the acceleration script of the quick application and that is sent by one or more second electronic devices; and the application server calculates a hit rate of the acceleration script of the quick application based on the hit result. Before that the application server sends the acceleration script of the quick application to the first electronic device based on the first request, the method further includes: The application server determines that the hit rate of the acceleration script of the quick application is not less than a preset value.

In some embodiments, that the application server generates an acceleration script of the quick application based on the application package includes: parsing the application package to obtain first source code corresponding to first screen display of the quick application; parsing the first source code to obtain an abstract syntax tree; injecting statistics upload code into one or more nodes of the abstract syntax tree to obtain second source code; obtaining a processed application package based on the second source code; running the processed application package to obtain a critical path indicated by the statistics upload code; selecting third source code from the first source code based on the critical path; and obtaining the acceleration script of the quick application based on the third source code.

According to a third aspect, an embodiment of this application provides a quick application startup method. The method includes: An integrated development platform receives first source code that is of a quick application and that is entered by a user; the integrated development platform generates an application package of the quick application based on the first source code of the quick application; the integrated development platform generates an acceleration script of the quick application based on the first source code of the quick application; and the integrated development platform sends the application package of the quick application and the acceleration script of the quick application to an application server.

In some embodiments, that the integrated development platform generates an acceleration script of the quick application based on the first source code of the quick application includes: selecting, from the first source code, second source code corresponding to first screen display of the quick application; parsing the second source code to obtain an abstract syntax tree; injecting statistics upload code into one or more nodes of the abstract syntax tree to obtain third source code; obtaining a processed application package based on the third source code; running the processed application package to obtain a critical path indicated by the statistics upload code; selecting fourth source code from the first source code based on the critical path; and obtaining the acceleration script of the quick application based on the fourth source code.

According to a fourth aspect, an embodiment of this application provides an electronic device. The electronic device includes one or more processors and a memory. The memory is coupled to the one or more processors, and the memory is configured to store program code. The one or more processors invoke the program code to enable the electronic device to perform the following operations: sending a first request to an application server, where the first request is used to indicate the application server to send an acceleration script of one or more quick applications to the electronic device; receiving the acceleration script that is of the one or more quick applications and that is sent by the application server; detecting a first operation for a target quick application, and in response to the first operation, sending a second request to the application server, where the second request is used to request an application package of the target quick application, and an acceleration script of the target quick application is included in the acceleration script of the one or more quick applications; in response to the first operation, running the acceleration script of the target quick application to obtain a first uniform resource locator URL, and obtaining first data from a third-party server based on the first URL; receiving the application package that is of the target quick application and that is sent by the application server; running the application package of the target quick application to obtain a second URL; and when the first URL is the same as the second URL, generating and displaying a first screen of the target quick application based on the first data.

In some embodiments, the one or more processors invoke the program code to enable the electronic device to further perform the following operation: receiving instant messaging information that includes the one or more quick applications.

In some embodiments, the one or more processors invoke the program code to enable the electronic device to further perform the following operation: detecting a user operation performed on an icon of the one or more quick applications.

In some embodiments, the one or more processors invoke the program code to enable the electronic device to further perform the following operation: receiving entered quick application name information. There is a correspondence between the quick application name information and the one or more quick applications.

In some embodiments, the one or more processors invoke the program code to enable the electronic device to further perform the following operations: when the first URL is different from the second URL, obtaining second data from the third-party server based on the second URL; and generating and displaying the first screen of the target quick application based on the second data.

In some embodiments, the one or more processors invoke the program code to enable the electronic device to further perform the following operation: when the first URL is the same as the second URL, sending, to the application server, information indicating that the acceleration script of the target quick application is successfully hit; or when the first URL is different from the second URL, sending, to the application server, information indicating that the acceleration script of the target quick application fails to be hit.

In some embodiments, the one or more processors invoke the program code to enable the electronic device to further perform the following operations: obtaining device data based on the acceleration script of the target quick application, where the device data includes one or more of a media access control MAC address, an engine version number, an Internet protocol IP address, an operating system version, address information, a network type, and a manufacturer brand of the electronic device; and obtaining the first URL based on the acceleration script of the target quick application and the device data.

According to a fifth aspect, an application server is provided. The application server includes one or more processors and a memory, the memory is coupled to the one or more processors, and the memory is configured to store program code. The one or more processors invoke the program code to enable the application server to perform the following operations: receiving an application package of a quick application; generating an acceleration script of the quick application based on the application package; receiving a first request sent by a first electronic device, where the first request is used to indicate the application server to send the acceleration script of the quick application to the first electronic device; and sending the acceleration script of the quick application to the first electronic device based on the first request.

In some embodiments, the one or more processors invoke the program code to enable the application server to further perform the following operations: receiving a hit result that is of the acceleration script of the quick application and that is sent by one or more second electronic devices; calculating a hit rate of the acceleration script of the quick application based on the hit result; and determining that the hit rate of the acceleration script of the quick application is not less than a preset value.

In some embodiments, the one or more processors invoke the program code to enable the application server to further perform the following operations: parsing the application package to obtain first source code corresponding to first screen display of the quick application; parsing the first source code to obtain an abstract syntax tree; injecting statistics upload code into one or more nodes of the abstract syntax tree to obtain second source code; obtaining a processed application package based on the second source code; running the processed application package to obtain a critical path indicated by the statistics upload code; selecting third source code from the first source code based on the critical path; and obtaining the acceleration script of the quick application based on the third source code.

According to a sixth aspect, an embodiment of this application provides an integrated development platform. The integrated development platform includes one or more processors and a memory, the memory is coupled to the one or more processors, and the memory is configured to store program code. The one or more processors invoke the program code to enable the integrated development platform to perform the following operations: receiving first source code that is of a quick application and that is entered by a user; generating an application package of the quick application based on the first source code of the quick application; generating an acceleration script of the quick application based on the first source code of the quick application; and sending the application package of the quick application and the acceleration script of the quick application to an application server.

In some embodiments, the one or more processors invoke the program code to enable the integrated development platform to further perform the following operations: selecting, from the first source code, second source code corresponding to first screen display of the quick application; parsing the second source code to obtain an abstract syntax tree; injecting statistics upload code into one or more nodes of the abstract syntax tree to obtain third source code; obtaining a processed application package based on the third source code; running the processed application package to obtain a critical path indicated by the statistics upload code; selecting fourth source code from the first source code based on the critical path; and obtaining the acceleration script of the quick application based on the fourth source code.

According to a seventh aspect, an embodiment of this application provides a computer program product including instructions. When the computer program product is run on an electronic device, the electronic device is enabled to perform the method described in any one of the first aspect to the third aspect and the possible implementations of the first aspect to the third aspect.

According to an eighth aspect, an embodiment of this application provides a computer-readable storage medium, including instructions. When the instructions are run on an electronic device, the electronic device is enabled to perform the method described in any one of the first aspect to the third aspect and the possible implementations of the first aspect to the third aspect.

In embodiments of this application, an electronic device requests an acceleration script of one or more quick applications from an application server; a first operation for a target quick application is detected, and in response to the first operation, the electronic device requests an application package of the target quick application from the application server, where an acceleration script of the target quick application is included in the acceleration script of the one or more quick applications; in response to the first operation, the electronic device runs the acceleration script of the target quick application to obtain a first URL, and obtains first data based on the first URL; and the electronic device may generate and display a first screen of the target quick application based on the first data. In this manner, data required for first screen display of the quick application can be obtained in advance by using the acceleration script. This improves quick application startup efficiency.

DETAILED DESCRIPTION OF ILLUSTRATIVE EMBODIMENTS

Figure 1A:
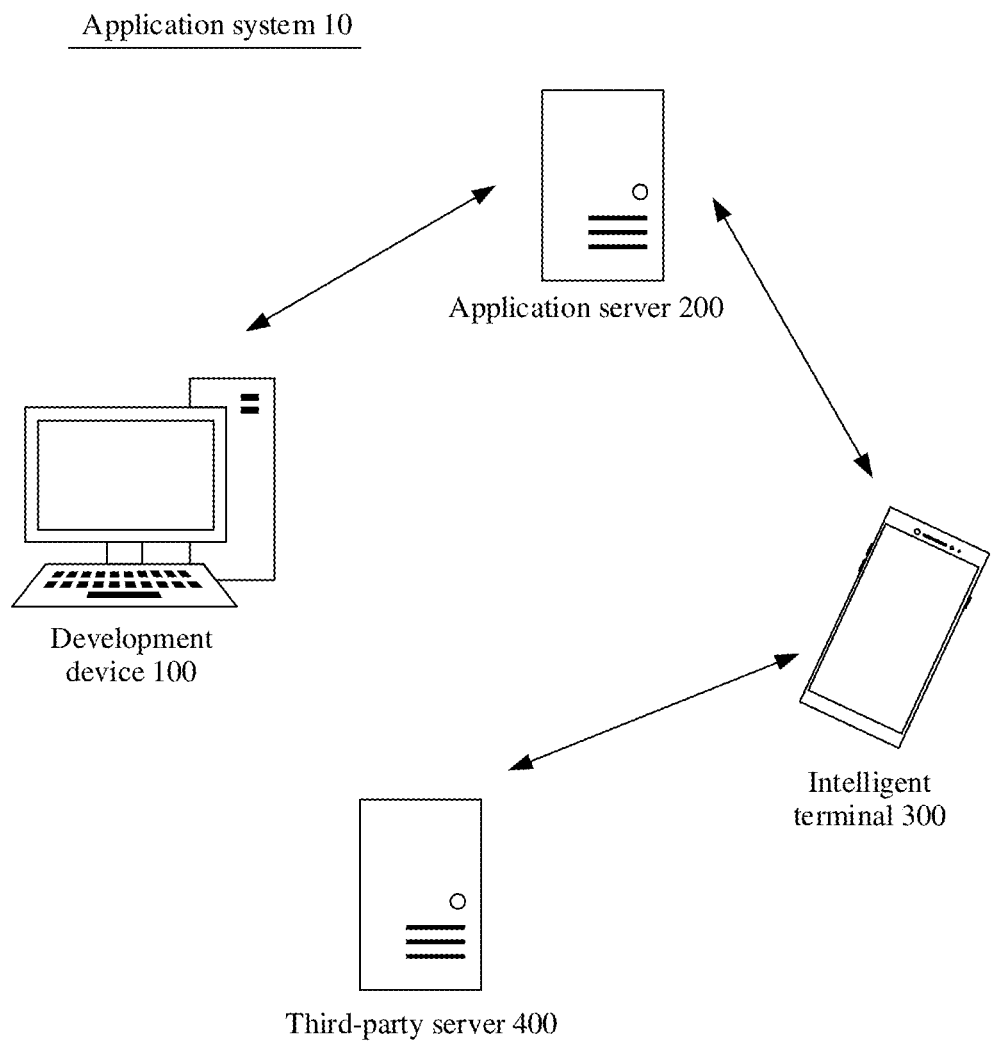
FIG. 1A is a schematic diagram of an application system according to an embodiment of this application.

The following clearly describes technical solutions in embodiments of this application in detail with reference to the accompanying drawings. In descriptions of embodiments of this application, unless otherwise stated, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features.

Some concepts related to this application are first described in detail.

A user interface (user interface, UI) in embodiments of this application is a medium interface for interaction and information exchange between an application or an operating system and a user, and implements conversion between an internal form of information and a form acceptable to the user. A user interface of an application is source code written in specific computer language such as Java or extensible markup language (extensible markup language, XML). The interface source code is parsed and rendered on an electronic device 300, and is finally displayed as content that can be identified by the user, for example, a control such as a picture, a text, or a button. A control (control) is a basic element of a user interface. Typical controls include a button (button), a widget (widget), a toolbar (toolbar), a menu bar (menu bar), a text box (text box), a scrollbar (scrollbar), a picture, and a text. An attribute and content of the control in the interface are defined by using a tag or a node. For example, the control included in the interface is defined in the XML by using a node such as <Textview>, <ImgView>, or <VideoView>. One node corresponds to one control or attribute in an interface. After being parsed and rendered, the node is displayed as user-visible content. In addition, interfaces of many applications such as a hybrid application (hybrid application) usually further include a web page. The web page, also referred to as a page, may be understood as a special control embedded in an application interface. The web page is source code written in a specific computer language, for example, hypertext markup language (hypertext markup language, HTML), cascading style sheets (cascading style sheets, CSS), or a Java script (JavaScript, JS). A browser or a web page display component whose function is similar to that of a browser may load and display the web page source code as content that can be identified by the user. Specific content included in the web page is also defined by using a tag or a node in the web page source code. For example, an element and an attribute of the web page are defined in the HTML by using <p>, <img>, <video>, or <canvas>.

A common representation form of a user interface is a graphical user interface (graphical user interface, GUI), and is a user interface that is displayed in a graphical manner and related to a computer operation. The graphical user interface may be an interface element such as a window or a control displayed on a display of an electronic device.

An integrated development environment (integrated development environment, IDE) is application software that assists program developers in developing software and can assist in writing source code text inside a development tool, compiling the text, and packaging the text into an available program. Some can also design graphical interfaces. An IDE usually includes a programming language editor, an automatic build tool, a debugger, and the like. Some IDEs include compilers/interpreters, and others do not. These IDEs can compile codes by invoking third-party compilers. Optionally, the IDE also includes a version control system and some tools for designing a graphical user interface. Many object-oriented modern IDEs also include category browsers, object viewers, object structure diagrams, and the like. In embodiments of this application, a quick application is usually developed in a specific IDE, for example, an IDE of a Huawei quick application.

An engine (engine) is a core component of a development program or system on an electronic platform. A developer may use the engine to quickly establish and lay out a function required by a program, or use the engine to assist running of the program. In general, an engine is a supporting part of a program or a set of systems. Common program engines include game engines, search engines, and antivirus engines. In embodiments of this application, a quick application needs to be interpreted and executed by using a dedicated engine.

The following describes an application system provided in embodiments of this application. FIG. 1A is a schematic diagram of an application system according to an embodiment of this application. The application system 10 may include a development device 100, an application server 200, an intelligent terminal 300, and a third-party server 400.

The development device 100 may be an electronic device configured with an IDE, such as a notebook computer or a desktop computer. In FIG. 1A, the desktop computer is used as an example. A program developer may write source code of a quick application by using the development device 100. After the source code of the quick application has been written, the development device 100 may generate an application package of the quick application based on the source code, and upload the application package to the application server 200 for a user to download and use. An application package is a set of files that can be automatically decompressed, and files required for running a quick application can be parsed.

The application server 200 may receive and store the application packet that is of the quick application and that is uploaded by the development device 100, and provide a quick application package download service for the intelligent terminal 300. Specifically, the application server 200 may receive a download request sent by the intelligent terminal 300, and the download request includes an identifier of a quick application. The application server 200 sends the application package of the quick application to the intelligent terminal 300 based on the identifier of the quick application.

The intelligent terminal 300 may be an electronic device that can support running of a quick application, such as a smartphone or a tablet computer. In FIG. 1A, the smartphone is used as an example. The user may download the application package of the quick application from the application server 200 by using the intelligent terminal 300.

The third-party server 400 may provide data required for running a quick application, for example, may provide data such as a news list and news content for a quick application of a news type. In a quick application initialization process, the intelligent terminal 300 obtains, through parsing, a URL corresponding to data required for first screen display of an application, and requests the data from the third-party server 400 based on the URL.

Figure 1B:
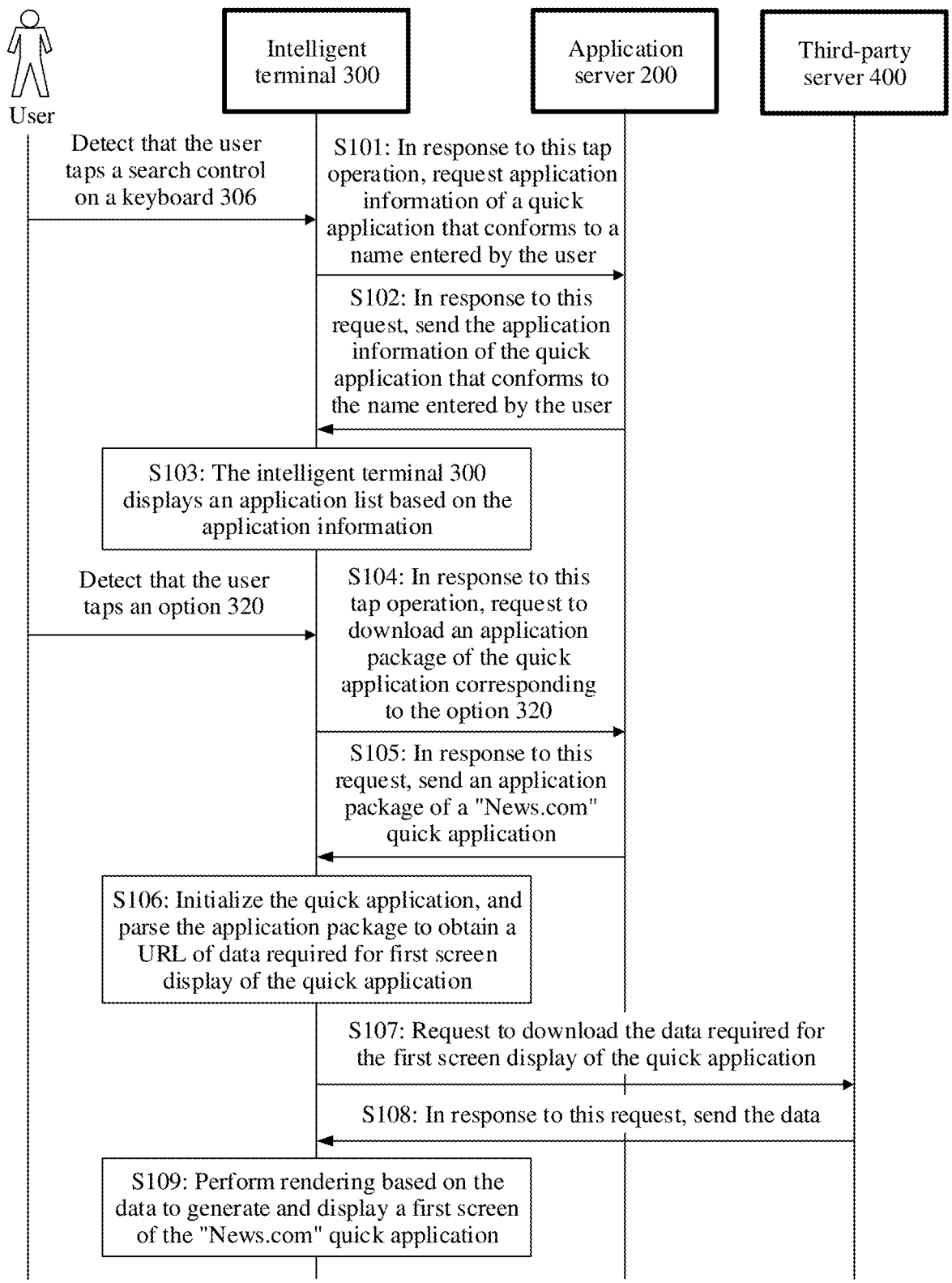
FIG. 1B is a flowchart of starting a quick application for a first time according to an embodiment of this application.

Currently, for a procedure of starting a quick application for the first time, refer to the flowchart shown in FIG. 1B. The procedure includes the following steps.

Figure 1C:
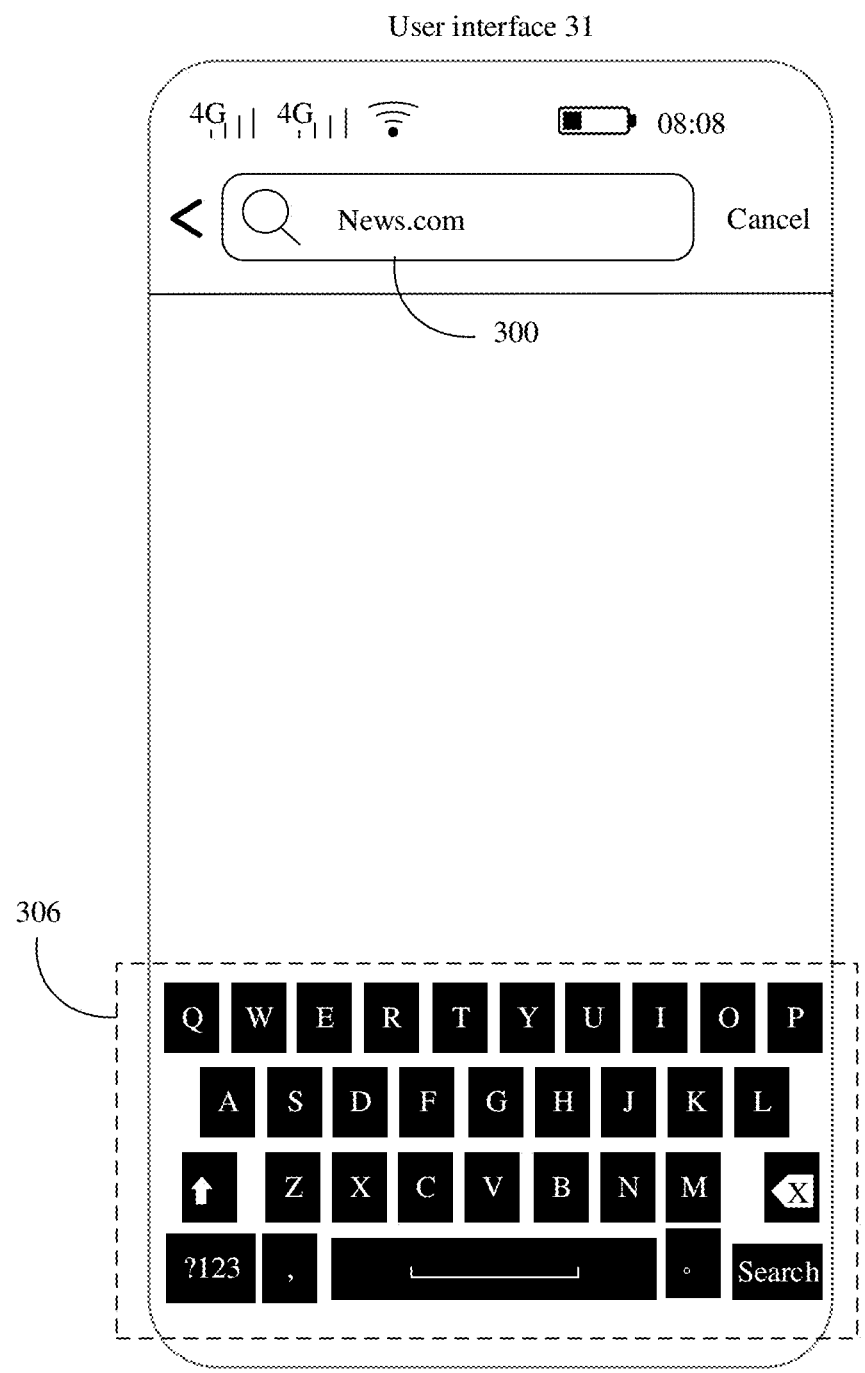
FIG. 1C is a schematic diagram of a search interface of a quick application according to an embodiment of this application.

FIG. 1C is a schematic diagram of a search interface of a quick application according to an embodiment of this application. As shown in a user interface 31 that is shown in FIG. 1C as an example, the user interface 31 includes an input box 300 and a keyboard 306.

S101: Detect that a user taps a search control on the keyboard 306. In response to this tap operation, the intelligent terminal 300 requests, from the application server 200, application information of an applet that conforms to a name entered by the user.

In some embodiments, the intelligent terminal 300 may send a request to the application server 200. The request includes the name entered by the user and is used to indicate the application server 200 to send, to the intelligent terminal 300, the application information of the applet that conforms to the entered name.

S102: In response to this request, the application server 200 sends, to the intelligent terminal 300, the application information of the applet that conforms to the name entered by the user.

Specifically, the application server 200 determines, based on the name entered by the user, the applet that conforms to the name entered by the user, and then sends, to the intelligent terminal 300, the application information of the applet that conforms to the name entered by the user.

S103: After receiving the application information sent by the application server 200, the intelligent terminal 300 displays an application list based on the application information.

Figure 1D:
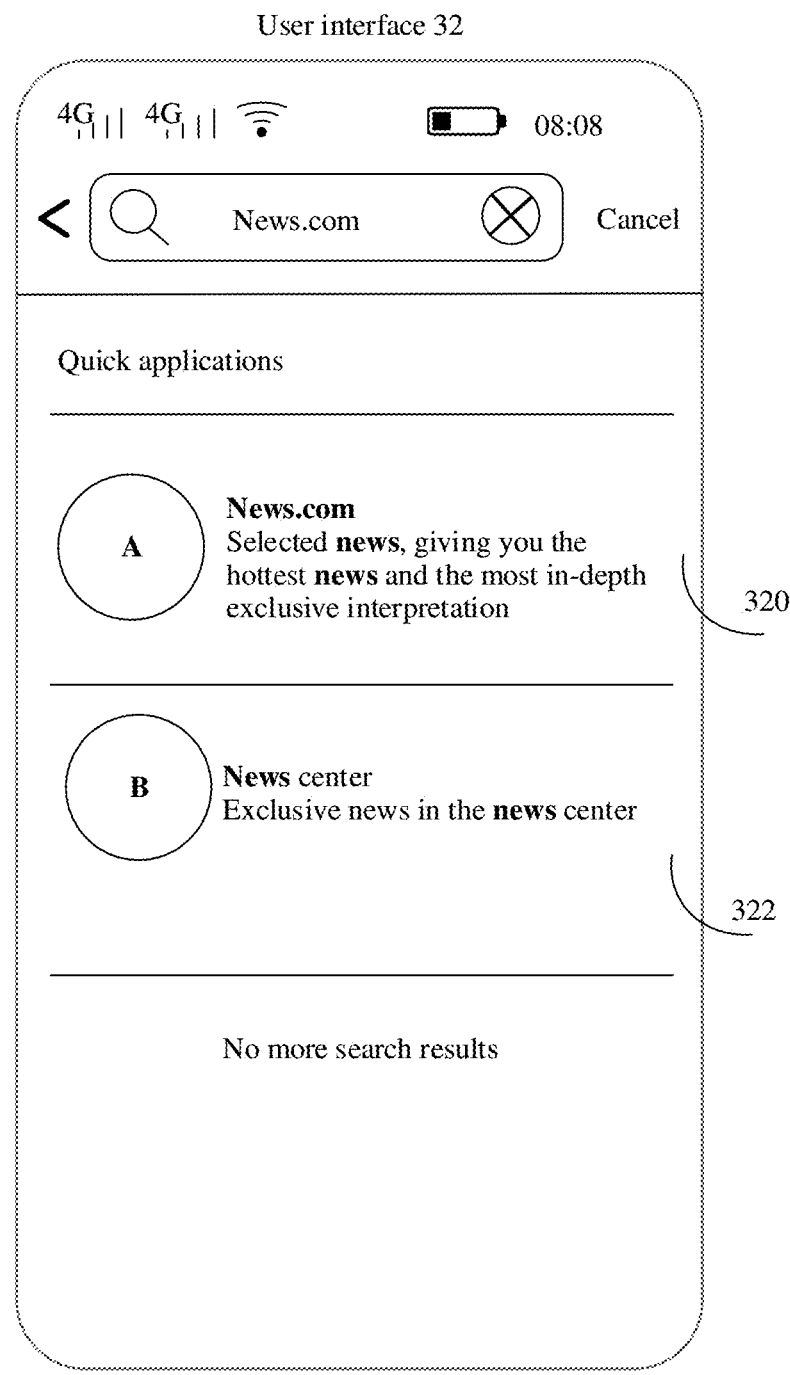
FIG. 1D is a schematic diagram of a user interface on which an application list is displayed according to an embodiment of this application.

For a user interface that displays the application list, refer to a user interface 32 shown in FIG. 1D as an example. The user interface 32 includes two list options: an option 320 and an option 322.

S104: Detect that the user taps the option 320. In response to this tap operation, the intelligent terminal 300 requests, from the application server 200, to download an application package of a quick application corresponding to the option 320.

S105: In response to this request, the application server 200 sends the application package of the "News.com" quick application to the intelligent terminal 300.

It should be noted that, before S106, the application server 200 stores the application package of the "News.com" quick application. The application package of the "News.com" quick application is sent by the development device 100 to the application server 200.

S106: After receiving the application package sent by the application server 200, the intelligent terminal 300 initializes the quick application, and parses the application package to obtain a URL of data required for first screen display of the quick application.

S107: The intelligent terminal 300 requests, from the third-party server 400 based on the URL, to download the data required for the first screen display of the quick application.

Specifically, before S107 is performed, a quick application engine of the instant messaging application (for example, WeChat application) determines that no data corresponding to the URL exists locally.

S108: The third-party server 400 sends the data to the intelligent terminal 300 in response to this request.

S109: After receiving the data sent by the third-party server 400, the intelligent terminal 300 performs rendering based on the data to generate and display a first screen of the "News.com" quick application.

In the foregoing scenario, the intelligent terminal 300 needs to download, from the third-party server 400 based on the URL obtained by parsing the application package, the data required for the first screen display after downloading the application package of the "News.com" quick application. As a result, it takes a long time to start the "News.com" quick application for the first time.

In this embodiment of this application, in response to the tap operation, the intelligent terminal 300 further requests acceleration scripts of two quick applications in the application list from the application server. The acceleration script may be parsed to obtain the URL corresponding to the data required for the first screen display of the quick application corresponding to the acceleration script. When detecting that the user taps the option 320, the intelligent terminal 300 requests, from the application server 200 in response to this tap operation, to download the application package of the quick application corresponding to the option 320. In addition, the intelligent terminal executes the acceleration script, and requests, from the third-party server 400 based on the URL obtained through parsing, the data required for the first screen display. After downloading of the application package is completed, the intelligent terminal 300 initializes the quick application. When the quick application requests the data required for the first screen display, the engine may send downloaded data to the quick application. In this way, the quick application may perform rendering based on the downloaded data to generate and display the first screen. This can reduce time for downloading the data required for the first screen display, and improve quick application startup efficiency.

Figure 2A:
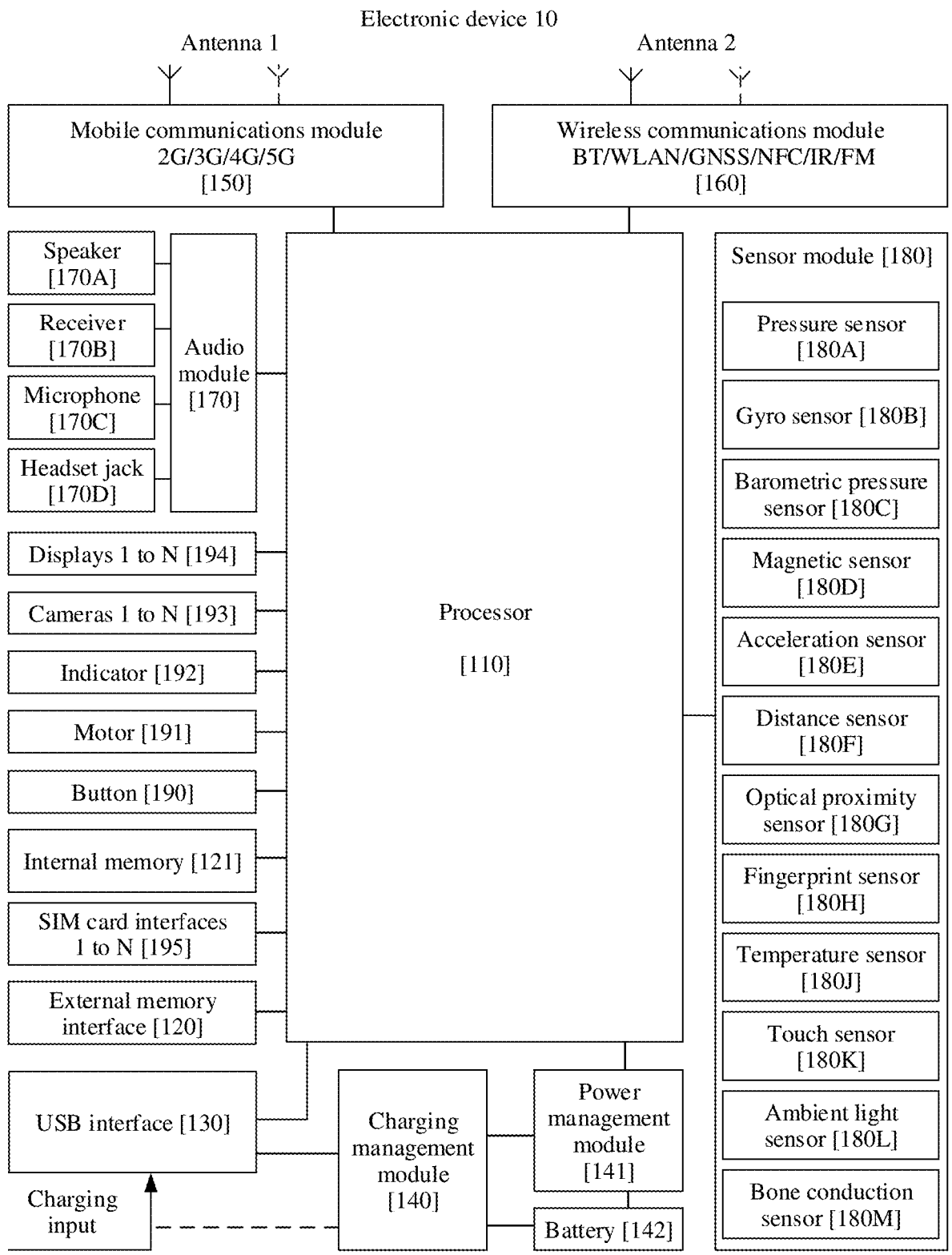
FIG. 2A is a schematic diagram of a structure of an electronic device 10 according to an embodiment of this application.

In embodiments of this application, the intelligent terminal 300 may be an electronic device. The following describes an electronic device 10 according to an embodiment of this application. FIG. 2A is a schematic diagram of a structure of the electronic device 10 according to an embodiment of this application.

The electronic device 10 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that the electronic device 10 shown in FIG. 2A is merely an example, and the electronic device 10 may have more or fewer components than those shown in FIG. 2A, may combine two or more components, or may have different component configurations. Various components shown in the figure may be implemented in hardware that includes one or more signal processing and/or application-specific integrated circuits, software, or a combination of hardware and software.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 10. The controller may generate an operation control signal based on instruction operation code and a time sequence signal, to complete control of instruction fetching and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). The processor 110 may be coupled to the touch sensor 180K through the I2C interface, so that the processor 110 communicates with the touch sensor 180K through an I2C bus interface, to implement a touch function of the electronic device 10.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be configured to: perform audio communication, and sample, quantize, and code an analog signal. In some embodiments, the audio module 170 may be coupled to the wireless communications module 160 through a PCM bus interface.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the display 194 through the DSI interface, to implement a display function of the electronic device 10.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like.

The USB interface 130 is an interface that complies with a USB standard specification, and may be specifically a mini USB interface, a micro USB interface, a USB Type-C interface, or the like. The USB interface 130 may be configured to connect to a charger to charge the electronic device 10, or may be configured to transmit data between the electronic device 10 and a peripheral device.

It may be understood that an interface connection relationship between the modules that is shown in this embodiment of the present invention is merely an example for description, and does not constitute a limitation on the structure of the electronic device 10. In some other embodiments of this application, the electronic device 10 may alternatively use an interface connection manner different from that in the foregoing embodiment, or a combination of a plurality of interface connection manners.

The charging management module 140 is configured to receive a charging input from a charger. The charger may be a wireless charger or a wired charger. The charging management module 140 may further supply power to the electronic device by using the power management module 141 when the battery 142 is charged.

The power management module 141 is configured to connect the battery 142 and the charging management module 140 to the processor 110. The power management module 141 receives input of the battery 142 and/or the charging management module 140, and supplies power to the processor 110, the internal memory 121, an external memory, the display 194, the camera 193, the wireless communications module 160, and the like.

A wireless communication function of the electronic device 10 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 10 may be configured to cover one or more communication frequency bands. Different antennas may further be multiplexed to improve antenna utilization. For example, the antenna 1 may be multiplexed as a diversity antenna of a wireless local area network. In other embodiments, the antenna may be used in combination with a tuning switch.

The mobile communications module 150 may provide a solution, applied to the electronic device 10, for wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like and that is applied to the electronic device 10. The wireless communications module 160 may be one or more components integrated into at least one communications processor module. The wireless communications module 160 receives an electromagnetic wave through the antenna 2, performs processing such as filtering or amplification on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. In this embodiment of this application, the electronic device 10 may establish communication connections to the application server 200 and the third-party server 400 by using the wireless communications module 160.

In some embodiments, the antenna 1 of the electronic device 10 is coupled to the mobile communications module 150, and the antenna 2 is coupled to the wireless communications module 160, so that the electronic device 10 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like.

The electronic device 10 implements a display function through a GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, or the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the electronic device 10 may include one or N displays 194, where N is a positive integer greater than 1.

The electronic device 10 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image.

The camera 193 is configured to capture a static image or a video. In some embodiments, the electronic device 10 may include one or N cameras 193, where N is a positive integer greater than 1.

The digital signal processor is configured to process a digital signal, and may process another digital signal in addition to the digital image signal. For example, when the electronic device 10 selects a frequency, the digital signal processor is configured to perform Fourier transform and the like on frequency energy.

The video codec is configured to compress or decompress a digital video. The electronic device 10 may support one or more types of video codecs. In this way, the electronic device 10 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU can implement applications such as intelligent cognition of the electronic device 10, such as image recognition, facial recognition, speech recognition, and text understanding.

The external memory interface 120 may be configured to be connected to an external memory card such as a micro SD card, to extend a storage capability of the electronic device 10. The external storage card communicates with the processor 110 through the external memory interface 120, to implement a data storage function. For example, files such as music and videos are stored in the external memory card.

The internal memory 121 may be configured to store computer executable program code. The executable program code includes instructions. The processor 110 runs the instructions stored in the internal memory 121 to perform various function applications of the electronic device 10 and process data. The internal memory 121 may include a program storage area and a data storage area. The program storage area may store an operating system, an application required by at least one function (for example, a voice playing function or an image playing function), and the like. The data storage area may store data (such as audio data and a phone book) and the like that are created during use of the electronic device 10. In addition, the internal memory 121 may include a high-speed random access memory, and may further include a nonvolatile memory, for example, at least one magnetic disk storage device, a flash memory device, or a universal flash storage (universal flash storage, UFS).

The electronic device 10 may implement an audio function by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal output, and is also configured to convert an analog audio input into a digital audio signal. The audio module 170 may further be configured to code and decode an audio signal.

The speaker 170A, also referred to as a "loudspeaker", is configured to convert an audio electrical signal into a sound signal. The electronic device 10 may be used to listen to music or answer a hands-free call by using the speaker 170A.

The receiver 170B, also referred to as an "earpiece", is configured to convert an audio electrical signal into a sound signal. When a call is answered or voice information is received by using the electronic device 10, the receiver 170B may be put close to a human ear to listen to a voice.

The microphone 170C, also referred to as a "mike" or a "mic", is configured to convert a sound signal into an electrical signal. When making a call, or sending voice information, the user may make a sound near the microphone 170C through the mouth of the user, to input a sound signal to the microphone 170C. At least one microphone 170C may be disposed in the electronic device 10.

The headset jack 170D is configured to connect to a wired headset. The headset jack 170D may be the USB interface 130, or may be a 3.5-mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. When a touch operation is performed on the display 194, the electronic device 10 detects intensity of the touch operation by using the pressure sensor 180A. The electronic device 10 may calculate a touch location based on a detection signal of the pressure sensor 180A.

The gyro sensor 180B may be configured to determine a motion posture of the electronic device 10. In some embodiments, an angular velocity of the electronic device 10 around three axes (namely, axes x, y, and z) may be determined by using the gyro sensor 180B. The gyro sensor 180B may be configured to perform image stabilization during photographing. The gyro sensor 180B may be further used in a navigation scenario and a motion-sensing game scenario.

The barometric pressure sensor 180C is configured to measure barometric pressure. In some embodiments, the electronic device 10 calculates an altitude based on a barometric pressure value measured by the barometric pressure sensor 180C, to assist in positioning and navigation.

The magnetic sensor 180D includes a Hall sensor. The electronic device 10 may detect opening and closing of a flip cover by using the magnetic sensor 180D.

The acceleration sensor 180E may detect accelerations in various directions (usually on three axes) of the electronic device 10, and may detect magnitude and a direction of gravity when the electronic device 10 is still. The acceleration sensor 180E may be further configured to recognize a posture of the electronic device, and is used in screen switching between a landscape mode and a portrait mode, a pedometer, or another application.

The distance sensor 180F is configured to measure a distance. The electronic device 10 may measure the distance in an infrared or a laser manner.

For example, the optical proximity sensor 180G may include a light-emitting diode (LED) and an optical detector, for example, a photodiode. The light-emitting diode may be an infrared light-emitting diode. The electronic device 10 emits infrared light by using the light-emitting diode. The electronic device 10 detects infrared reflected light from a nearby object by using the photodiode. The electronic device 10 may detect, by using the optical proximity sensor 180G, that the user holds the electronic device 10 close to an ear for a call, to automatically turn off a screen for power saving.

The ambient light sensor 180L is configured to sense ambient light brightness. The electronic device 10 may adaptively adjust brightness of the display 194 based on the sensed ambient light brightness.

The fingerprint sensor 180H is configured to collect a fingerprint. The electronic device 10 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 10 executes a temperature processing policy based on the temperature detected by the temperature sensor 18J.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor 180K. The touch sensor may transfer the detected touch operation to the application processor, to determine a type of a touch event. For example, the touch event type may be a tap event, a double-tap event, a touch-and-hold event, a force touch (force touch) event, a drag event, or the like. Visual output related to the touch operation may be provided on the display 194. In some other embodiments, the touch sensor 180K may alternatively be disposed on a surface of the electronic device 10 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal.

The button 190 includes a power button, a volume button, and the like. The button 190 may be a mechanical button, or may be a touch button. The electronic device 10 may receive a button input, and generate a button signal input related to user settings and function control of the electronic device 10.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 10. The electronic device 10 may support one or N SIM card interfaces, where N is a positive integer greater than 1. The SIM card interface 195 may support a nano-SIM card, a micro-SIM card, a SIM card, and the like. In some embodiments, the electronic device 10 uses an eSIM, that is, an embedded SIM card. The eSIM card may be embedded in the electronic device 10, and cannot be separated from the electronic device 10.

Figure 2B:
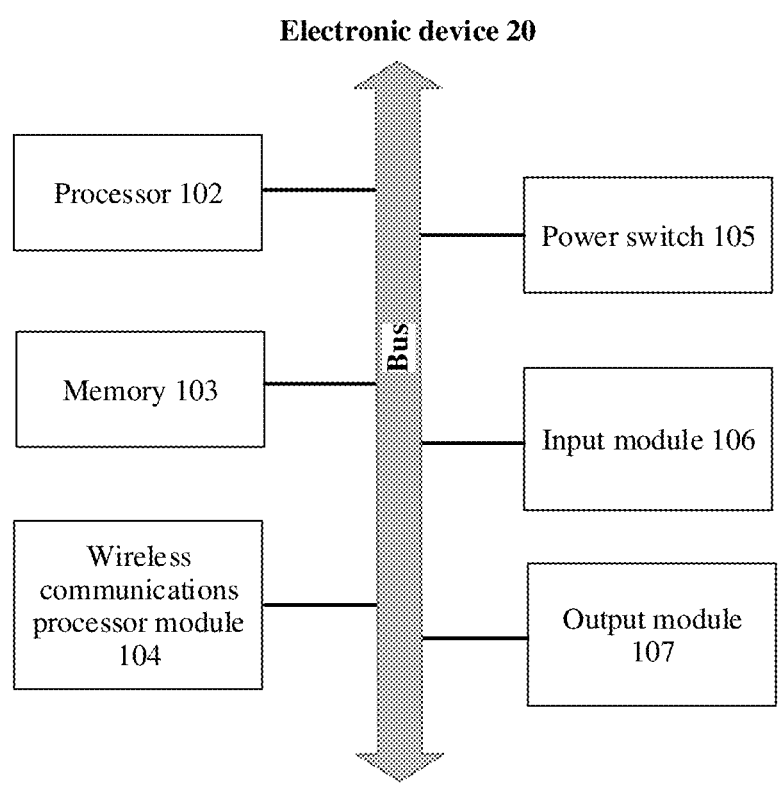
FIG. 2B is a schematic diagram of a structure of an electronic device 20 according to an embodiment of this application.

In embodiments of this application, the development device 100 may be an electronic device. The following describes an electronic device 20 according to an embodiment of this application. FIG. 2B is a schematic diagram of a structure of the electronic device 20 according to an embodiment of this application. For example, the electronic device 20 may be a device such as a desktop computer or a notebook computer. As shown in FIG. 2B, the electronic device 20 may include a processor 102, a memory 103, a wireless communications processor module 104, a power switch 105, an input module 106, and an output module 107. These components may be connected through a bus.

The processor 102 may be configured to read and execute computer-readable instructions. During specific implementation, the processor 102 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and address conversion. The register is mainly responsible for storing a quantity of register operations, intermediate operation results, and the like that are temporarily stored during instruction execution. During specific implementation, a hardware architecture of the processor 102 may be an application-specific integrated circuit (Application-Specific Integrated Circuit, ASIC) architecture, an MIPS architecture, an ARM architecture, an NP architecture, or the like.

In some embodiments, the processor 102 may be configured to generate an application package of a quick application based on source code that is of the quick application and that is written by a developer. The processor 102 may be further configured to: parse a signal received by the wireless communications processor module 104, and generate a signal sent by the wireless communications processor module 104.

The memory 103 is coupled to the processor 102, and is configured to store various software programs and/or a plurality of sets of instructions. During specific implementation, the memory 103 may include a high-speed random access memory, and may further include a nonvolatile memory, for example, one or more magnetic disk storage devices, a flash memory device, or another nonvolatile solid-state storage device. The memory 103 may store an operating system, for example, an embedded operating system such as Windows or Android. The memory 103 may further store a communications program, and the communications program may be used to communicate with the application server 200 or an additional device.

The wireless communications processor module 104 may provide a wireless communication solution that includes a wireless local area network (wireless local area network, WLAN) (for example, a Wi-Fi network), Bluetooth (Bluetooth, BT), BLE advertising, a global navigation satellite system (global navigation satellite system, GNSS), frequency modulation (frequency modulation, FM), near field communication (near field communication, NFC), an infrared (infrared, IR) technology, and the like and that is applied to the electronic device 20. The wireless communications processor module 104 may be one or more components integrated into at least one communications processor module. The electronic device 20 may establish a wireless communication connection to another device by using the wireless communications processor module 104, and communicate with the another device by using one or more wireless communications technologies of Bluetooth or a WLAN. In some embodiments, the electronic device 20 may send an application package of a quick application to the application server 200 by using the wireless communications processor module 104.

The wireless communications processor module 104 may further include a cellular mobile communications processor module (not shown). The cellular mobile communications processor module may communicate with another device (for example, a server) by using a cellular mobile communications technology.

The power switch 105 may be configured to control a power supply to supply power to the electronic device 20.

The input module 106 may be configured to receive an instruction entered by a user. For example, the input module 106 may include one or more of a mouse, a keyboard, a touchpad, a touchscreen, a microphone, and the like.

The output module 107 may be configured to output information. For example, the electronic device 20 includes one or more displays, and the display may be configured to display an image, a video, and the like. The display includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In addition, the output module 107 may further include one or more of a speaker, a sound box, and the like.

It may be understood that the structure shown in FIG. 2B does not constitute any specific limitation on the electronic device 20. In some other embodiments of this application, the electronic device 20 may include more or fewer components than those shown in the figure, or combine some components, or split some components, or have different component arrangements. The components shown in the figure may be implemented by hardware, software, or a combination of software and hardware.

A software system of the electronic device 10 may use a layered architecture, an event-driven architecture, a microkernel architecture, a micro service architecture, or a cloud architecture. In an embodiment of this application, an Android system with a layered architecture is used as an example to describe a software structure of the electronic device 10.

Figure 2C:
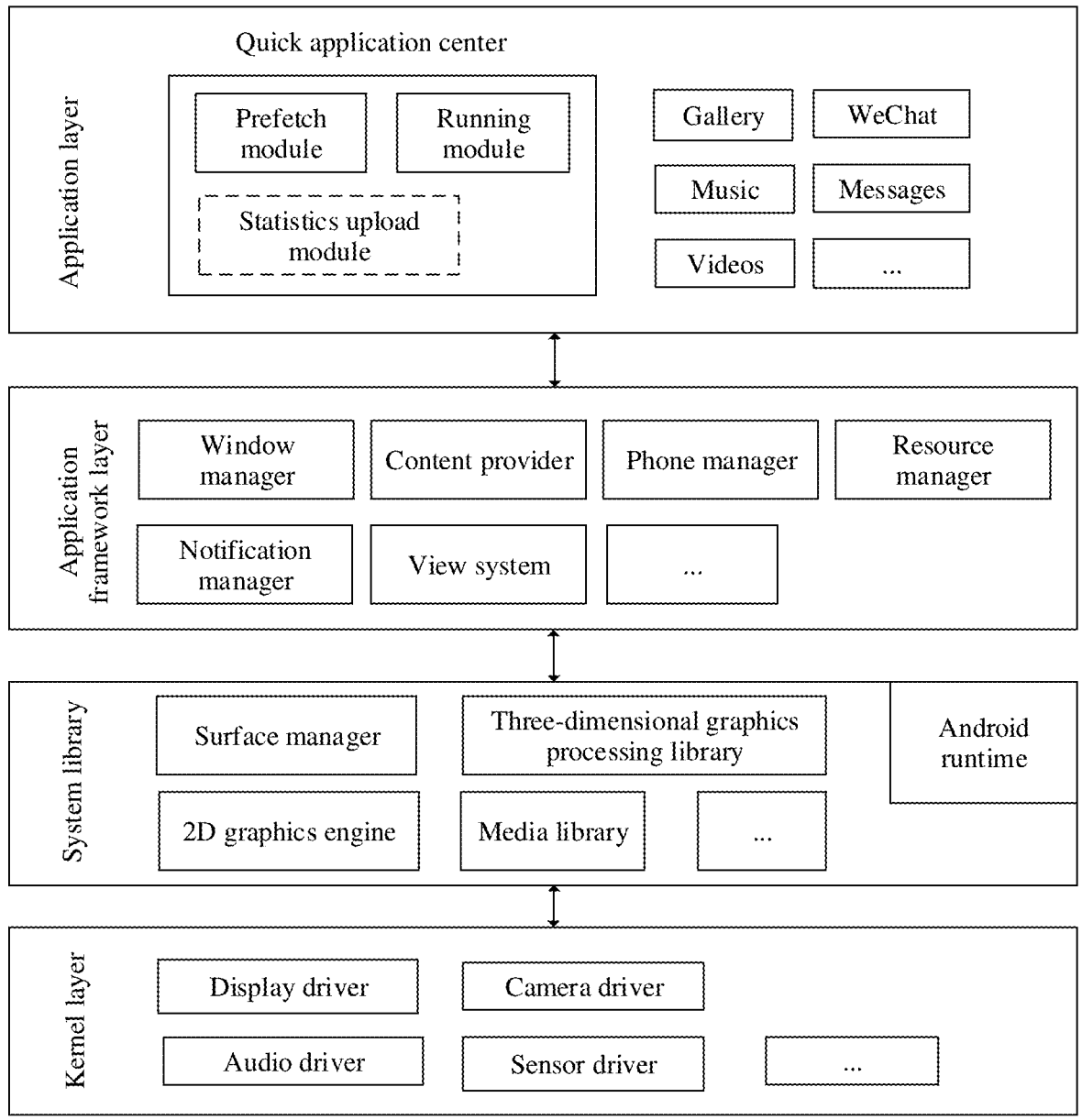
FIG. 2C is a block diagram of a software structure of the electronic device 10 according to an embodiment of this application.

FIG. 2C is a block diagram of the software structure of the electronic device 10 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages. As shown in FIG. 2C, the application package may include applications such as a quick application center, "WeChat", "Gallery", "Music", "Videos", and "Messages".

The quick application center may provide a function required for running a quick application. The quick application center may be an application. Alternatively, the quick application center may be integrated, as a function, into another application that can provide a quick application, for example, "WeChat", "App Store", or "Google".

Specifically, the quick application center may include a prefetch module, a running module, and a statistics upload module. In this embodiment of this application, the prefetch module may obtain, based on an acceleration script sent by the application server 200, a first URL of data required for first screen display of a quick application, and obtain, from the third-party server 400 based on the first URL, the data required for the first screen display. The running module may run the quick application. In a scenario in which the quick application is started for the first time, the running module may initialize the quick application based on the application package sent by the application server 200, and obtain, through parsing, a second URL of the data required for the first screen display of the quick application. When the first URL is the same as the second URL, the running module obtains, from the prefetch module, the data required for the first screen display. The statistics upload module may feed back a hit condition of the acceleration script to the application server 200 based on the first URL and the second URL. If the first URL is the same as the second URL, it is fed back, to the application server 200, that the acceleration script of the quick application is successfully hit; or if the first URL is different from the second URL, it is fed back, to the application server 200, that the acceleration script of the quick application fails to be hit. In some embodiments, the quick application center may alternatively not include the statistics upload module.

The application framework layer provides an application programming interface (application programming interface, API) and a programming framework for an application at the application layer. The application framework layer includes some predefined functions.

As shown in FIG. 2C, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history, a bookmark, an address book, and the like.

The view system includes visual controls, such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 10, for example, management of a call status (including answering, declining, and the like).

The resource manager provides various resources for an application, such as a localized character string, an icon, an image, a layout file, and a video file.

The notification manager enables an application to display notification information in the status bar, and may be used to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running in the background, or a notification that appears on the screen in a form of a dialog window. For example, text information is prompted in the status bar, a prompt tone is produced, a smart terminal vibrates, or an indicator light blinks.

The Android runtime includes a kernel library and a virtual machine. The Android runtime is responsible for scheduling and management of the Android system.

The kernel library includes two parts: One part is a performance function that needs to be invoked by Java language, and the other part is an Android kernel library.

The application layer and the application framework layer are run on the virtual machine. The virtual machine executes Java files at the application layer and the application framework layer as binary files. The virtual machine is configured to implement functions such as object life cycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2 D graphics engine (for example, SGL).

The surface manager is configured to manage a display subsystem and provide fusion of 2 D and 3 D layers for a plurality of applications.

The media library supports playback and recording of a plurality of commonly used audio and video formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like. The 2 D graphics engine is a drawing engine for 2 D drawing.

The kernel layer is a layer between hardware and software. The kernel layer includes at least a display driver, a camera driver, an audio driver, and a sensor driver.

It should be noted that the software architecture of the electronic device shown in FIG. 2C is merely an implementation of embodiments of this application. During actual application, the electronic device may alternatively include more or fewer software modules. This is not limited herein. In the embodiments of this application, based on the software structure shown in FIG. 2C, the intelligent terminal 300 may further include a display module. The display module is configured to display a corresponding user interface based on running of each software module. For the user interface displayed by the display module, refer to the user interfaces shown in FIG. 1C, FIG. 1D, and FIG. 4A to FIG. 4C. The display module may be specifically implemented as the display 194 in FIG. 2A.

Figure 2D:
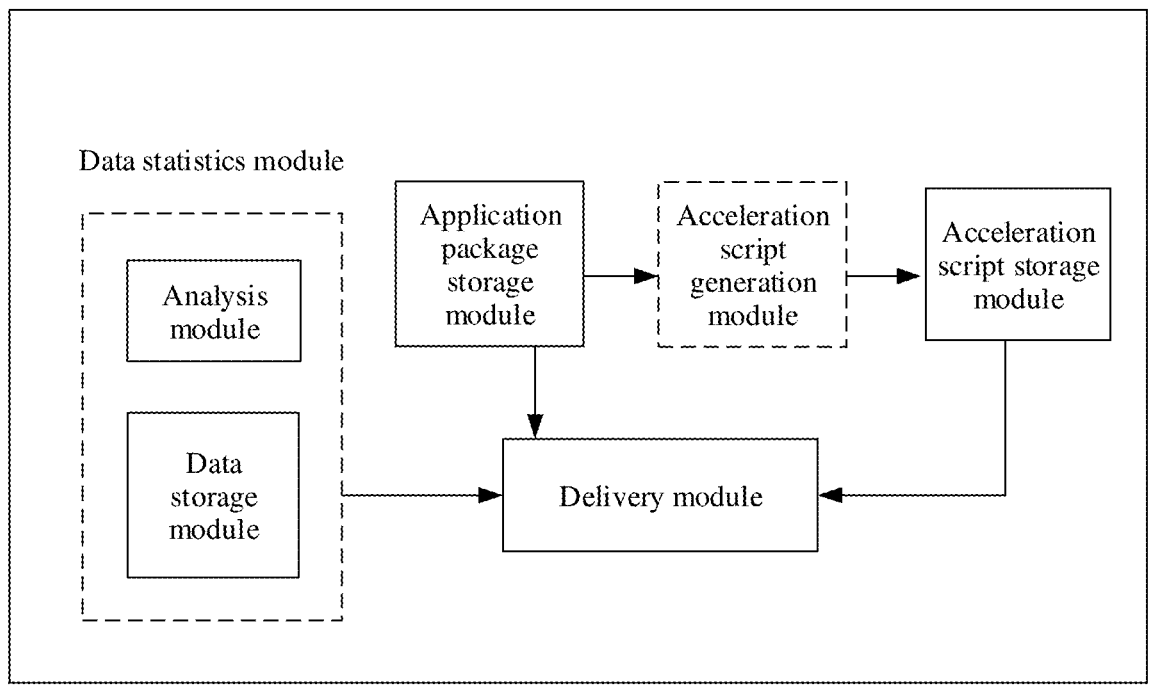
FIG. 2D is a block diagram of a software structure of an application server 200 according to an embodiment of this application.

FIG. 2D is a block diagram of a software structure of an application server 200 according to an embodiment of this application. The application server 200 may include an application package storage module, an acceleration script generation module, an acceleration script storage module, a data statistics module, and a delivery module.

The application package storage module may be configured to store an application package sent by the development device 100 to the application server 200.

The acceleration script generation module may generate, based on the application package in the application package storage module, an acceleration script corresponding to the application package. Specifically, one application package corresponds to one acceleration script.

The acceleration script storage module may be configured to store an acceleration script generated by the acceleration script generation module. Optionally, an application package and an acceleration script of a quick application may include a same application identifier.

The data statistics module may be configured to calculate a hit rate of an acceleration script. The data statistics module may include an analysis module and a data storage module. The data storage module may store a hit result of an acceleration script sent by the intelligent terminal 300. The analysis module may calculate a hit rate of the acceleration script based on the hit result.

The delivery module may be configured to: receive a request sent by the intelligent terminal 300, and send an application package or an acceleration script of a quick application to the intelligent terminal 300 in response to the request. In some embodiments, the delivery module may select a to-be-sent application package from the application package storage module based on an application identifier in the request, or select a to-be-sent acceleration script from the acceleration script storage module based on an application identifier in the request. In some embodiments, the delivery module may receive a hit rate of an acceleration script sent by the data statistics module, compare the hit rate with a preset value, and determine whether to send the acceleration script to the intelligent terminal 300. For example, the preset value may be 90%, or other data. This is merely an example. If the hit rate is not less than the preset value, the delivery module sends the acceleration script to the intelligent terminal 300. If the hit rate is less than the preset value, the delivery module does not send the acceleration script to the intelligent terminal 300.

In some embodiments, the application server 200 may alternatively not include the data statistics module. In some embodiments, the application server 200 may alternatively not include the acceleration script generation module. In this case, the application server 200 may receive and store the acceleration script sent by the development device 100.

Figure 2E:
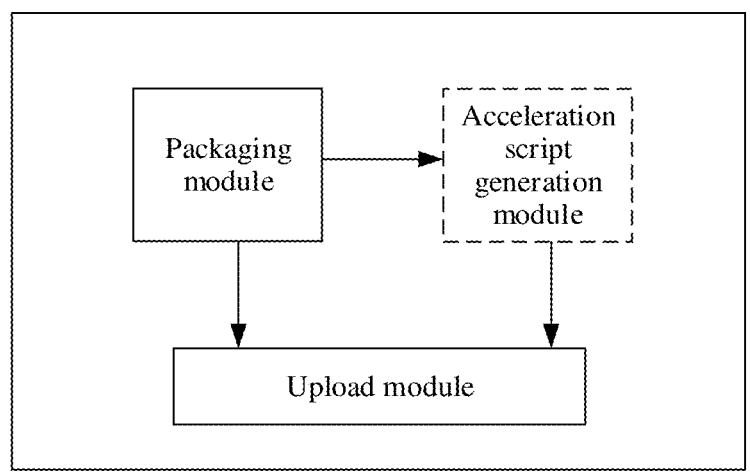
FIG. 2E is a block diagram of a software structure of a development device 100 according to an embodiment of this application.

FIG. 2E is a block diagram of a software structure of a development device 100 according to an embodiment of this application. The development device 100 may include a packaging module, an acceleration script generation module, and an upload module. Specifically, the packaging module may receive a source program (or referred to as source code) of a quick application written by a user, and generate an application package of the quick application based on the source code. The acceleration script generation module may generate, based on the source program of the quick application written by the user, an acceleration script corresponding to the quick application. Specifically, one quick application corresponds to one acceleration script. The upload module may send the generated application package and the acceleration script to the application server 200. In some embodiments, the development device 100 may not include the acceleration script generation module. In this case, the application server 200 includes the acceleration script generation module.

Figures 1, 3A:
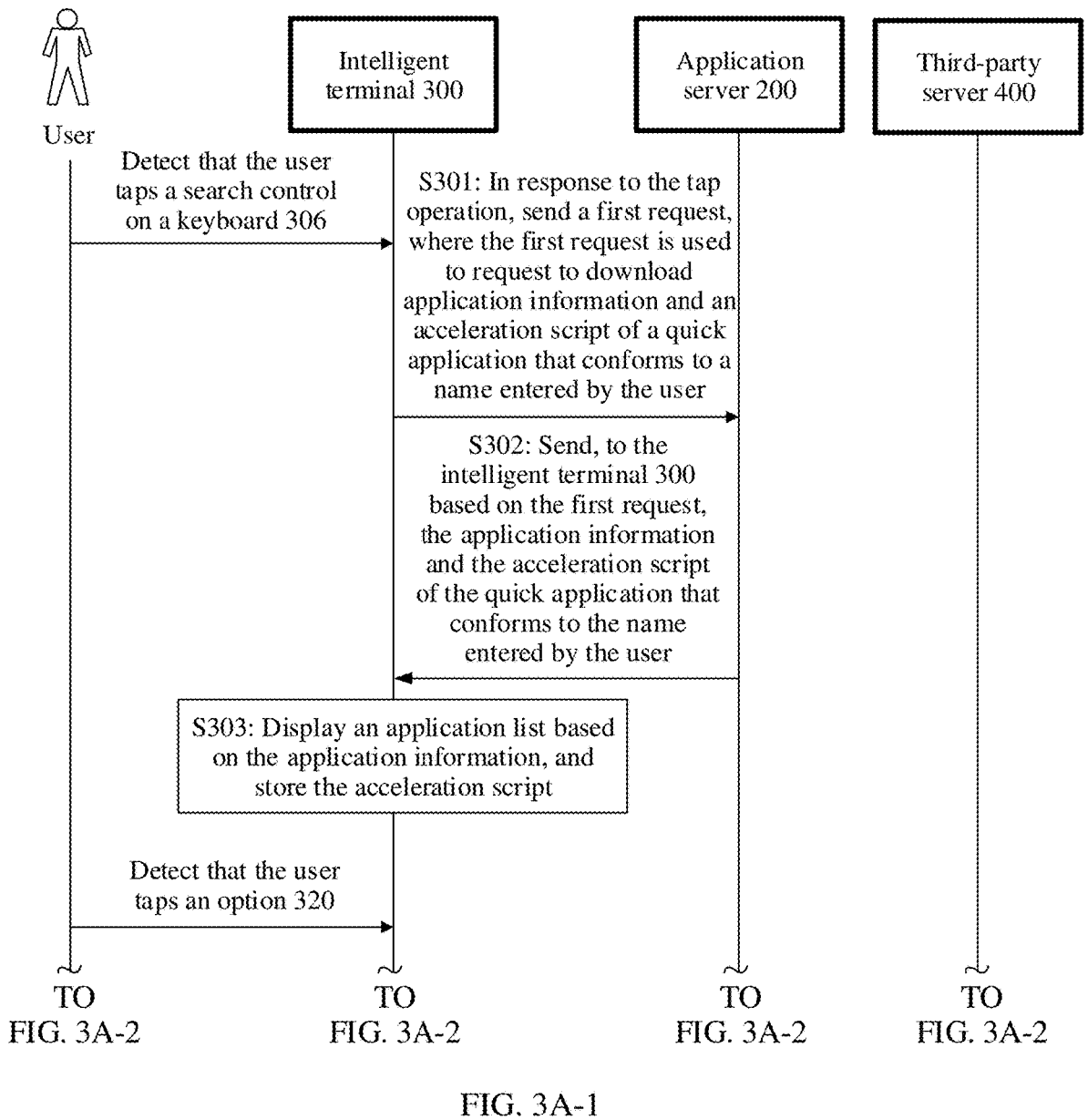
FIG. 3A-1 and FIG. 3A-2 are a flowchart of a quick application startup method according to an embodiment of this application.
Figures 2, 3A:
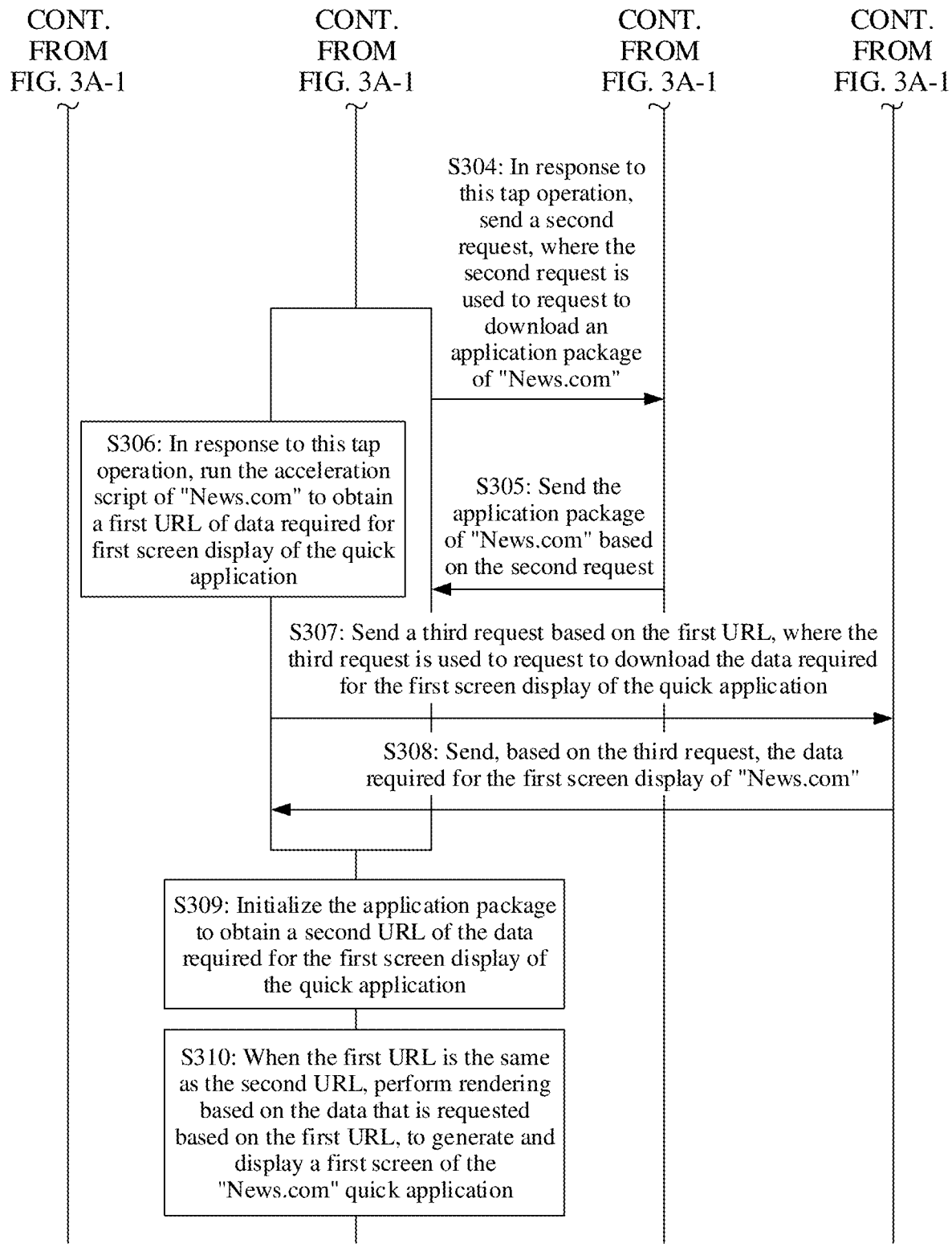

The following describes in detail an application startup method in embodiments of this application with reference to other accompanying drawings based on the application system 10, the development device 100, the application server 200, the intelligent terminal 300, and the third-party server 400 described in the foregoing content. It should be noted that, in this embodiment of this application, the quick application is started for the first time, that is, the intelligent terminal 300 does not store an application package of the quick application. FIG. 3A-1 and FIG. 3A-2 are a flowchart of a quick application startup method according to an embodiment of this application. The method includes the following steps.

S301: Detect that a user taps a search control on the keyboard 306, and in response to the tap operation, send a first request to the application server 200. The first request is used to request to download application information and an acceleration script of a quick application that conforms to a name entered by the user. For a display interface of the intelligent terminal 300, refer to the user interface 31 shown in FIG. 1C.

S302: After the application server 200 receives the first request sent by the intelligent terminal 300, the application server 200 sends, to the intelligent terminal 300 based on the first request, the application information and the acceleration script of the quick application that conforms to the name entered by the user.

The application server 200 establishes a connection relationship with the intelligent terminal 300 in advance. For example, a Huawei mobile phone may establish a connection relationship with a Huawei application server in advance. Specifically, the application server 200 determines, based on the name entered by the user, the quick application that conforms to the name entered by the user, and then sends, to the intelligent terminal 300, the application information and the acceleration script of the quick application that conforms to the name entered by the user.

In some embodiments, a name of an applet that conforms to the name entered by the user may be the same as the entered name, or may include all or some characters in the entered name. The application information may include a name, an icon, introduction information, and the like of the quick application. For example, if the name entered by the user is "News.com", applets that are determined by the application server 200 and that conform to the name entered by the user are "News.com" and "News center".

In another possible implementation, the applets that conform to the name entered by the user may further include an applet of a same type as an applet corresponding to the name entered by the user. For example, if the name entered by the user is "Video.com", applets that conforms to the name entered by the user may include "Video.com", and may further include video-type quick applications such as "xx player" and "Korean drama center" that are of a same type as the "Video.com".

In some embodiments, the acceleration script storage module of the application server 200 pre-stores acceleration scripts of a plurality of quick applications. The delivery module of the application server 200 may select acceleration scripts of "News.com" and "News center" from the plurality of acceleration scripts based on determined identifiers of the "News.com" and "News center" quick applications. In this embodiment of this application, a size of an acceleration script is usually relatively small, for example, 8 kilobytes (KB) or 10 KB.

In some embodiments, before the delivery module of the application server 200 sends the acceleration script of "News.com" to the intelligent terminal 300, the delivery module of the application server 200 determines that a hit rate of the acceleration script of "News.com" is not less than a preset value. Similarly, A hit rate of "News center" can be determined. In this way, accuracy of an acceleration script may be improved.

Optionally, the data statistics module of the application server 200 may calculate a hit rate of an acceleration script. The data statistics module may receive a plurality of hit results fed back by the intelligent terminals 300. Specifically, if a first URL obtained based on an acceleration script is the same as a second URL obtained based on an application package, it indicates that a correct URL of data required for first screen display of the quick application can be obtained based on the acceleration script, and it is determined that the acceleration script is successfully hit. If the first URL is different from the second URL, it indicates that a URL, obtained based on the acceleration script, of the data required for the first screen display of the quick application is incorrect, and it is determined that the acceleration script fails to be hit. The statistics upload module of the intelligent terminal 300 may send a hit result of an acceleration script to the application server 200 in real time. For example, after step S309 in this embodiment is performed, the intelligent terminal 300 may send a hit result of the acceleration script of "News.com" to the application server 200.

The following describes an example of a manner of calculating a hit rate of the acceleration script of "News.com". Within a specific preset time period (for example, a time value such as 10 minutes or 20 minutes), the data storage module stores 1000 hit results of the acceleration script of "News.com", where there are 968 successful hit results, and therefore, a hit rate obtained by the analysis module based on these hit results is 96.8%. If a preset value is 90%, the delivery module determines that the hit rate is greater than the preset value, and the delivery module sends the acceleration script of "News.com" to the intelligent terminal 300. In some embodiments, the data statistics module may calculate a hit rate of the acceleration script of "News.com" every preset time period.

In some other embodiments, before the delivery module of the application server 200 sends the acceleration script of "News.com" to the intelligent terminal 300, the delivery module of the application server 200 determines that a size of the acceleration script of "News.com" is not greater than a preset threshold. For example, the preset threshold may be 15 KB, 20 KB, or the like. In this way, it can be ensured that the size of the sent acceleration script is relatively small, and a download speed is relatively high.

S303: After receiving the application information and the acceleration script that are sent by the application server 200, the intelligent terminal 300 displays an application list based on the application information, and stores the acceleration script.

For a user interface that displays the application list of the quick application, refer to the user interface 32 as an example shown in FIG. 1D. The user interface 32 includes two list options: an option 320 and an option 322. In some embodiments, a manner of storing the acceleration script by the intelligent terminal 300 may be caching. In this manner, the acceleration script can be quickly read.

S304: Detect that the user taps the option 320. In response to this tap operation, the intelligent terminal 300 sends a second request to the application server 200. The second request is used to request to download an application package of a quick application (namely, "News.com") corresponding to the option 320.

The second request may include an identifier of "News.com". Optionally, the running module of the quick application center of the intelligent terminal 300 sends the second request to the application server 200 in response to the tap operation.

S305: After the application server 200 receives the second request sent by the intelligent terminal 300, the application server 200 sends the application package of "News.com" to the intelligent terminal 300 based on the second request.

The application package storage module of the application server 200 pre-stores application packages of a plurality of quick applications. The delivery module of the application server 200 may select the application package of "News.com" from the plurality of application packages based on the identifier of "News.com" in the second request.

S306: In response to this tap operation, the intelligent terminal 300 further runs the acceleration script of "News.com" to obtain a first URL of data required for first screen display of the quick application.

In some embodiments, the intelligent terminal 300 may obtain one or more of a media access control address (Media Access Control Address, MAC address) of the intelligent terminal 300, an engine version number, an Internet protocol address (IP address), an operating system version, address information (for example, information such as HANGZHOU or GUANGZHOU) of the intelligent terminal 300, and a current network type (for example, 3G, 4G, or Wi-Fi) of the intelligent terminal 300, and one or more of a manufacturer brand (for example, Huawei) of the intelligent terminal 300 based on the acceleration script of "News.com", and then generate the first URL based on the obtained information.

S307: The intelligent terminal 300 sends a third request to the third-party server 400 based on the first URL. The third request is used to request to download the data required for the first screen display of the quick application.

Optionally, the prefetch module of the quick application center of the intelligent terminal 300 may run the acceleration script of "News.com", and send the third request to the third-party server 400 based on the first URL.

S308: After the third-party server 400 receives the third request sent by the intelligent terminal 300, the third-party server 400 sends, to the intelligent terminal 300 based on the third request, the data required for the first screen display of "News.com".

Optionally, the prefetch module of the quick application center of the intelligent terminal 300 may store the data that is sent by the third-party server 400 and that is required for the first screen display of "News.com". Alternatively, the storage module of the intelligent terminal 300 stores the data, and the prefetch module may record a storage path of the data.

S309: After the intelligent terminal 300 receives the application package of "News.com" sent by the application server 200, the intelligent terminal 300 initializes the application package to obtain a second URL of the data required for the first screen display of the quick application.

Optionally, the running module of the quick application center of the intelligent terminal 300 may initialize the application package.

S310: When the first URL is the same as the second URL, the intelligent terminal 300 performs rendering based on the data obtained through requesting based on the first URL, to generate and display a first screen of the "News.com" quick application.

Figure 3B:
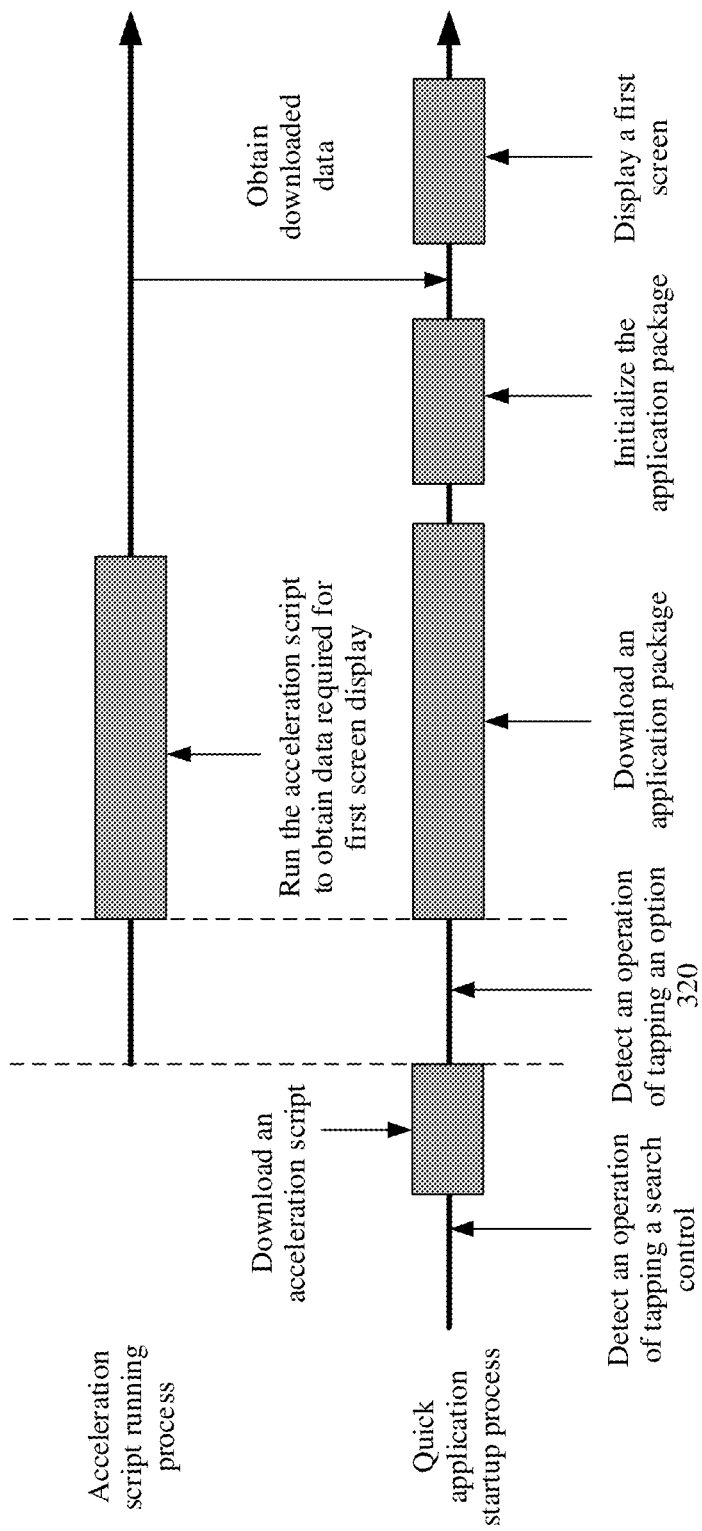
FIG. 3B is a schematic diagram of a quick application startup process and an acceleration script execution process according to an embodiment of this application.

Optionally, when the first URL is the same as the second URL, the running module obtains downloaded data or a storage path of the data from the prefetch module, and then performs rendering based on the downloaded data to generate and display the first screen. For example, for a quick application startup process and an acceleration script execution process, refer to a schematic diagram shown in FIG. 3B.

In some embodiments, when the first URL is different from the second URL, the intelligent terminal obtains new data from the third-party server based on the second URL, and then performs rendering based on the new data to generate and display the first screen of the quick application.

In this way, the intelligent terminal 300 may perform rendering to generate and display the first screen based on the data that is downloaded based on the first URL obtained by parsing the acceleration script of the "News.com" quick application. When the application package is downloaded and initialized, the data required for the first screen display of the quick application can be downloaded. This reduces quick application startup time and improves quick application startup efficiency.

In some embodiments, the user may alternatively select two or more quick application options. In this case, in response to this tap operation, the intelligent terminal 300 requests to download application packages of quick applications corresponding to these options, runs acceleration scripts corresponding to the application packages, and then displays first screens of the quick applications in the foregoing described manner. For example, in a screen splitting scenario, the intelligent terminal 300 may display a first screen of a quick application in each of a plurality of display areas.

The foregoing embodiment describes an implementation process of an application startup manner provided in this embodiment of this application in a scenario in which a user searches for a quick application. It should be noted that the application startup method in this embodiment of this application may be further applied to another use scenario. The following describes some other scenarios.

Figure 4A:
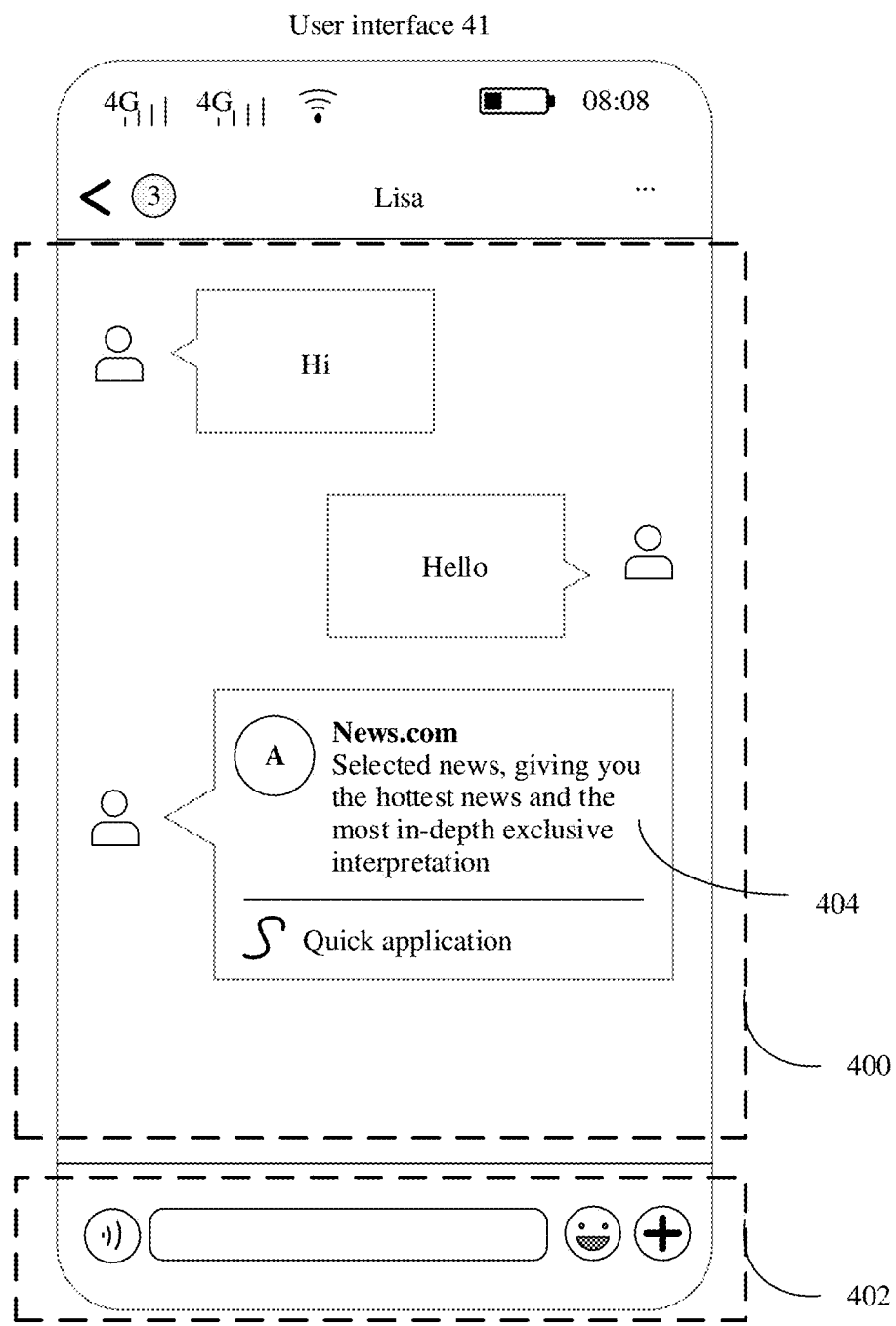
FIG. 4A is a schematic diagram of a chat interface of an instant messaging application according to an embodiment of this application.

FIG. 4A is a schematic diagram of a chat interface of an instant messaging application according to an embodiment of this application. As shown in FIG. 4A, a user interface 41 includes a display area 400 and an input area 402. The display area 400 is used to display a chat record between a user who uses the intelligent terminal 300 and a chat object (namely, Lisa). The input area 402 is used to enter a chat message, for example, a text, a voice, or an emoticon.

When the intelligent terminal 300 receives quick application information 404 sent by the chat object, the prefetch module of the intelligent terminal 300 may send a request to the application server 200, to obtain an acceleration script of "News.com". Optionally, before the prefetch module of the intelligent terminal 300 sends the request to the application server 200, the prefetch module determines that the intelligent terminal does not locally store the acceleration script of "News.com". In this way, a problem of time waste caused by repeatedly obtaining the acceleration script can be avoided.

When it is detected that the user taps the quick application information 404, in response to this tap operation, the prefetch module of the intelligent terminal 300 runs the acceleration script, and sends a request to the application server 200 based on an obtained third URL, to obtain data required for first screen display of "News.com". In addition, in response to the tap operation, the running module of the intelligent terminal 300 sends a request to the application server 200, to obtain an application package of "News.com". After the application package sent by the application server 200 is received, the running module initializes the application package to obtain a fourth URL of the data required for the first screen display. When the third URL is the same as the fourth URL, the running module obtains downloaded data from the prefetch module, and then performs rendering based on the downloaded data to generate and display a first screen of the "News.com" quick application.

In this way, when receiving a quick application message, the intelligent terminal 300 obtains the acceleration script of the "News.com" quick application. When the user taps the quick application message, the intelligent terminal 300 obtains the application package of the "News.com" quick application, and obtains, in advance based on the acceleration script, the data required for the first screen display of the quick application. This can reduce quick application startup time and improve quick application startup efficiency.

In some other embodiments, when the quick application information 404 sent by the chat object is received, the prefetch module of the intelligent terminal 300 may send a request to the application server 200, to obtain an acceleration script of "News.com". In addition, after the acceleration script sent by the application server 200 is received, the prefetch module of the intelligent terminal 300 runs the acceleration script, and sends a request to the application server 200 based on an obtained third URL, to obtain data required for first screen display of "News.com".

In this way, before the application package is downloaded, the data required for the first screen display of the quick application may be obtained in advance by using the acceleration script. In a subsequent application package initialization process, the downloaded data may be used to render the first screen of the quick application, thereby reducing quick application startup time and improving quick application startup efficiency.

Figure 4B:
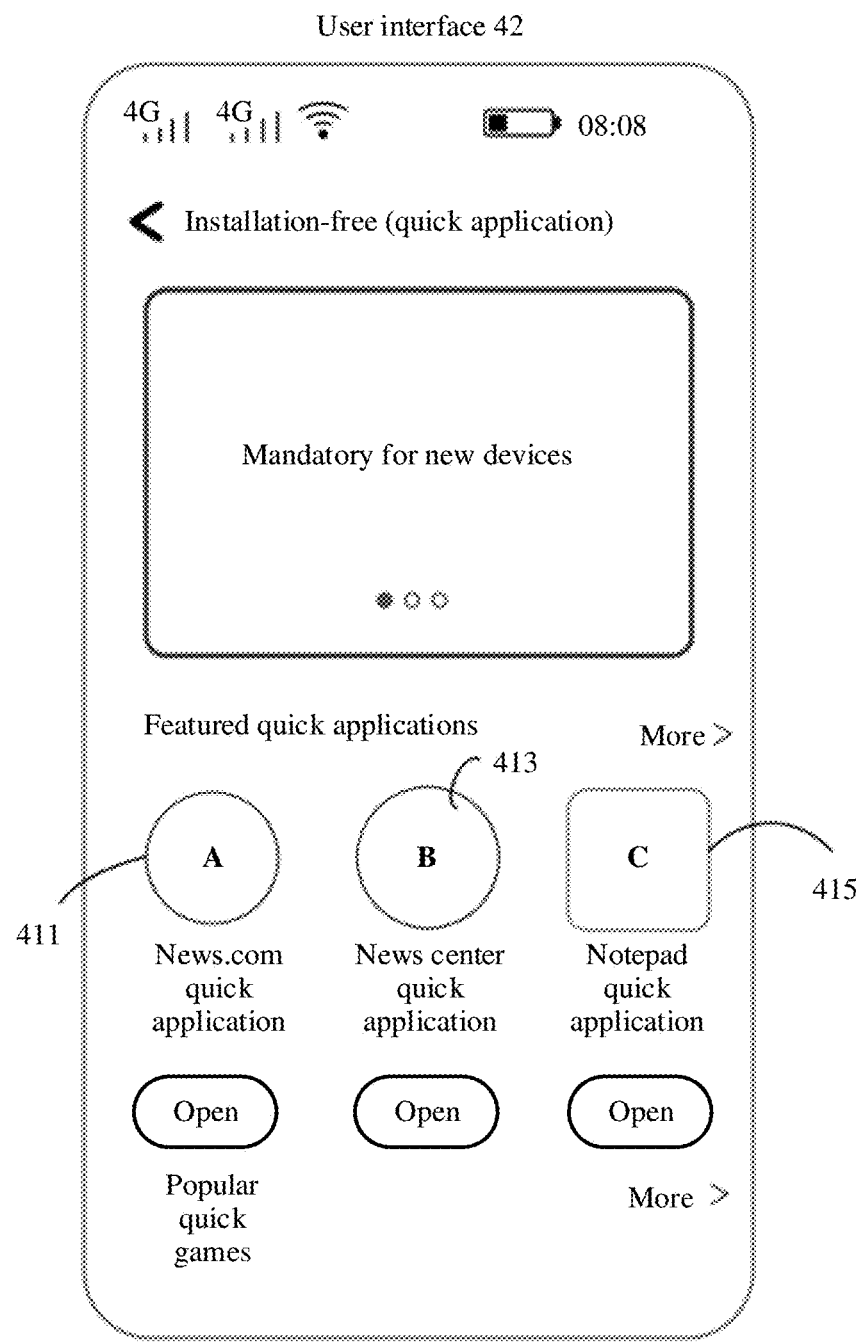
FIG. 4B is a schematic diagram of another search interface of a quick application in an application store according to an embodiment of this application.

FIG. 4B is a schematic diagram of another search interface of a quick application in an application store according to an embodiment of this application.

As shown in FIG. 4B, a user interface 42 may display icons of a plurality of quick applications. For example, the user interface 42 displays an icon 411 of a "News.com" quick application, an icon 413 of a "News center" quick application, and an icon 415 of a "Notepad" quick application.

Figure 4C:
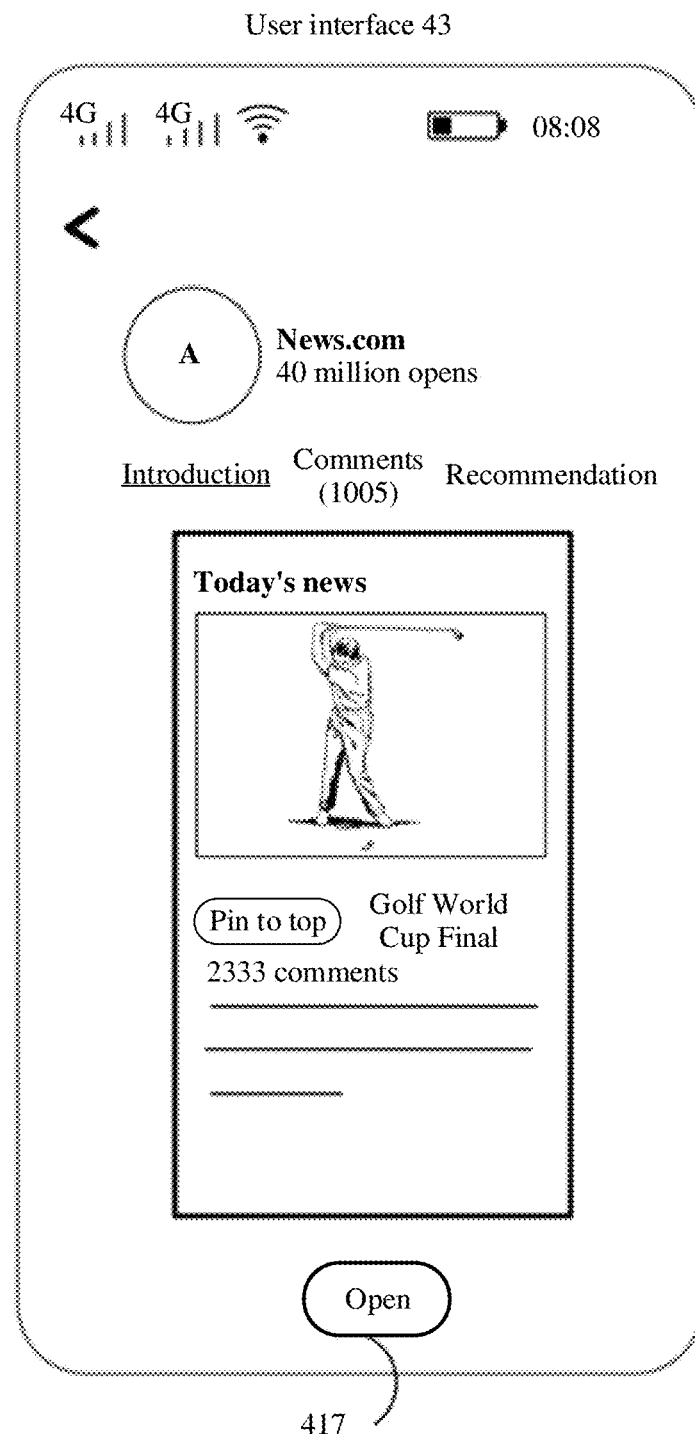
FIG. 4C is a schematic diagram of a detail page of a quick application according to an embodiment of this application.

When it is detected that a user taps the icon 411, the intelligent terminal 300 switches, in response to the tap operation, from displaying the user interface 42 to displaying a user interface 43. FIG. 4C is a schematic diagram of a detail page of a quick application according to an embodiment of this application. A user interface 43 is used to display detail information about a "News.com" quick application, for example, an icon, a name, a quantity of download times, an application introduction, a comment, and a related recommendation.

Specifically, in response to the tap operation, the prefetch module of the intelligent terminal 300 may send a request to the application server 200, to obtain application information and an acceleration script of "News.com". Optionally, before the prefetch module of the intelligent terminal 300 sends the request to the application server 200, the prefetch module determines that the intelligent terminal does not locally store the acceleration script of "News.com". In this way, a problem of time waste caused by repeatedly obtaining the acceleration script can be avoided.

When it is detected that the user taps an open control 417, in response to the tap operation, the prefetch module of the intelligent terminal 300 runs the acceleration script, and sends a request to the application server 200 based on an obtained fifth URL, to obtain data required for first screen display of "News.com". In addition, in response to the tap operation, the running module of the intelligent terminal 300 sends a request to the application server 200, to obtain an application package of "News.com". After the application package sent by the application server 200 is received, the running module initializes the application package to obtain a sixth URL of the data required for the first screen display. When the fifth URL is the same as the sixth URL, the running module obtains downloaded data from the prefetch module, and then performs rendering based on the downloaded data to generate and display a first screen of the "News.com" quick application.

In this way, when the user views a detail message of the quick application, the intelligent terminal 300 obtains the acceleration script of the "News.com" quick application. When the user taps the open control, the intelligent terminal 300 obtains the application package of the "News.com" quick application, and obtains, in advance based on the acceleration script, the data required for the first screen display of the quick application. This can reduce quick application startup time and improve quick application startup efficiency.

In some other embodiments, when it is detected that the user taps the icon 411, the prefetch module of the intelligent terminal 300 may send a request to the application server 200, to obtain an acceleration script of a "News.com" quick application. In addition, after the acceleration script sent by the application server 200 is received, the prefetch module of the intelligent terminal 300 runs the acceleration script, and sends a request to the application server 200 based on an obtained fifth URL, to obtain data required for first screen display of the "News.com" quick application. In this way, before the application package is downloaded, the data required for the first screen display of the quick application may be obtained in advance by using the acceleration script. In a subsequent application package initialization process, the downloaded data may be used to render a first screen of the quick application, thereby reducing quick application startup time and improving quick application startup efficiency.

It should be noted that, in addition to the three application scenarios described above, the application startup method provided in this embodiment of this application may be further applied to another scenario. For example, the intelligent terminal 300 may include a low-power-consumption camera, and the intelligent terminal 300 may determine, based on gesture information recognized by the low-power-consumption camera, to request an acceleration script from the application server 200.

In some other embodiments, when detecting that a user starts an application that can run a quick application, the intelligent terminal 300 may download acceleration scripts of some quick applications in advance based on information such as a behavior habit of the user, a quick application use record, and a user profile. When the user subsequently triggers startup of these quick applications, the intelligent terminal 300 obtains, in advance based on the acceleration scripts, data required for first screen display of the quick applications. This reduces quick application startup time and improves quick application startup efficiency.

In these scenarios, data required for first screen display of a quick application can be obtained in advance by using an acceleration script. This reduces quick application startup time and improves quick application startup efficiency.

The foregoing describes an implementation procedure of the quick application startup method according to the embodiments of this application. The following further describes a manner in which an acceleration script generation module generates an acceleration script based on an application package.

Figure 5A:
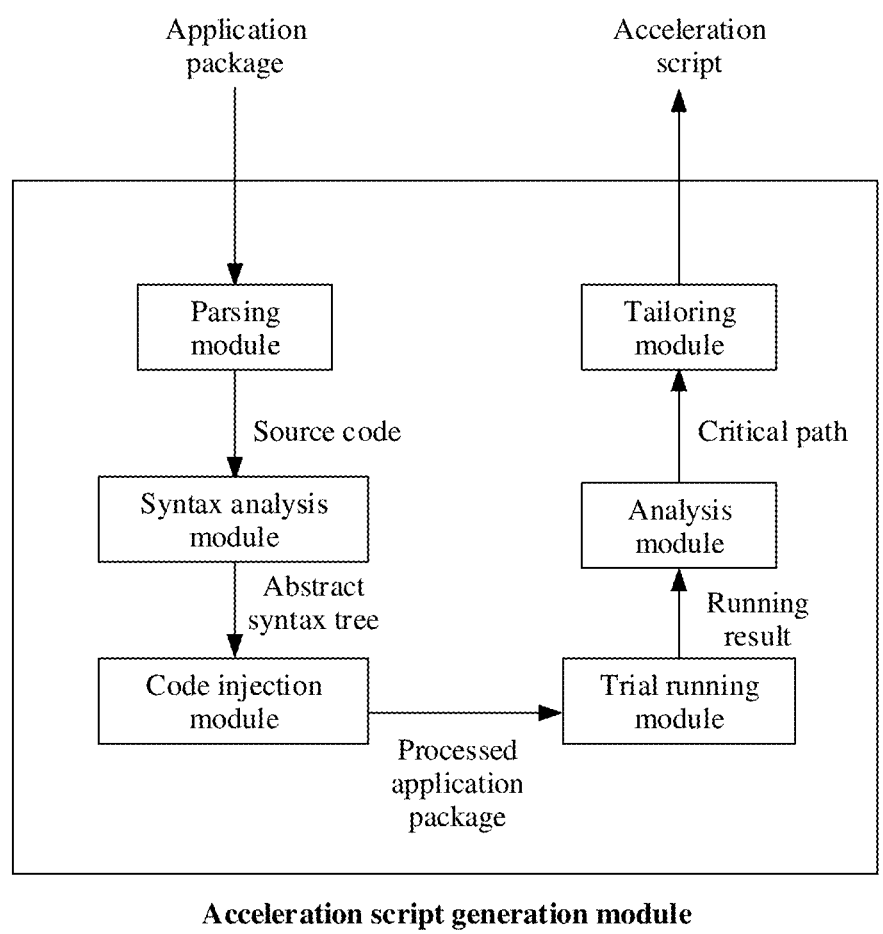
FIG. 5A is a block diagram of a software structure of an acceleration script generation module according to an embodiment of this application.

In a first manner, for the acceleration script generation module, refer to a block diagram of a software structure shown in FIG. 5A. The acceleration script generation module includes a parsing module, a syntax analysis module, a code injection module, a trial running module, an analysis module, and a tailoring module.

Specifically, the parsing module is configured to parse the application package to obtain source code related to first screen display when a quick application is started. For example, in a quick application scenario, the source code related to the first screen display is specified in a configuration file (for example, manifest.json) in a root directory of the application package. In the manifest.json file, router.entry indicates an entry of an application. A js file in this entry is the source code required for the first screen display.

The syntax analysis module is configured to parse the source code into an abstract syntax tree ((abstract syntax tree, AST), or a syntax tree (syntax tree) for short) in a syntax analysis manner. Syntax analysis (syntax analysis, or referred to as parsing) is a process of analyzing an input text formed in a word sequence (for example, an English word sequence) and determining a syntax structure of the input text, according to a form rule used when an application is compiled. The syntax analysis may be implemented by using a parser. The parser (parser) is usually used as a component of a compiler or an interpreter, and is used to check syntax and construct a data structure (usually a hierarchical data structure such as a syntax analysis tree or an abstract syntax tree) including input words. The parser usually uses an independent lexical analyzer to separate words from an input character stream one by one and uses a word stream as its input.

The AST is an abstract representation of a syntax structure of the source code. The abstract syntax tree indicates a syntax structure of programming language in a tree form. Each node on the tree indicates a structure in the source code. Syntax is "abstract" because it does not represent every detail of real syntax. For example, nested parentheses are hidden in the structure of the tree and are not presented in a node form. A conditional jump statement similar to "if-condition-then" can be represented by a node with two branches.

The code injection module is configured to analyze the abstract syntax tree, and inject statistics upload code into a selected node of the abstract syntax tree. The selected node may be one or more of nodes such as a function entry, a logical fork node, a variable getter (getter) and setter (setter) node, and an in-application network resource request (that is, requesting data required for first screen display) node. For example, data output by the statistics upload code may include a specific location of code that is run (for example, a specific line of a file in which the code is located) and a moment at which the code is run. The statistics upload code is used to determine the specific location that is of the executed code in subcode to which the node belongs and that is in the source code. After the statistics upload code is injected into the source code, the code injection module repackages processed source code, to obtain a processed application package. Subsequently, the code injection module sends the processed application package to the trial running module.

Optionally, in this embodiment of this application, a hook technology may be used to intercept variable getter (getter) and setter (setter) operations. The hook technology is a manner of intercepting and changing native behavior of a program. A hook can be used to hook a call of the program. Before the program is to execute the call, predefined logic in the hook is executed. After the predefined logic is executed, the native behavior of the program is selected to be executed or not executed. The variable getter (getter) and setter (setter) operations are intercepted by using the hook technology, so that it can be sensed when a variable is used (for example, a value of the variable is obtained or a value of the variable is modified), to determine whether the variable can be simplified. The trial running module is configured to run the processed application package to obtain the specific location that is of the executed code in the subcode to which the node belongs, that is in the source code, and that is fed back by the statistic upload code. Subsequently, the trial running module sends a running result and the processed application package to the analysis module.

The analysis module is configured to determine, from the processed application package based on the running result fed back by the trial running module, a critical path from initializing the application to performing in-application network request. Specifically, the location information fed back by the trial running module reflects whether each line of code of the subcode to which the node belongs has an execution record, and which code is the critical path may be determined according to the record.

The following code is used as an example for description. fetch(url) is an in-application network resource request node.

```
Source code:
global_data = { switch : true, base_url : "" }
unused = { foo : 0 }
main( ) {
  foo_method0( );
  foo_method1( );
  foo_method2( );
}
foo_method0( ) {
  global_data.base_url = "http://xxx.com";
}
foo_method1( ) {
  if (switch) {
    id = device_id( );
    url = global_data.base_url + "?device_id=" + id;
    fetch(url);//location of a request
```

-continued

```
  } else {
    // ...
  }
}
foo_method2( ) {//foo_method2 is not executed before fetch is executed
  unused.foo = 1;
}
unused_method( ) {
  // ...
}
```

Based on the location information fed back by the running module, the following critical path may be obtained:

```
global_data = { switch : true, base_url : "" }
}
main( ) {
  foo_method0( );
  foo_method1( );
}
foo_method0( ) {
  global_data.base_url = "http://xxx.com";
}
foo_method1( ) {
  id = device_id( );
  url = global_data.base_url + "?device_id=" + id;
  fetch(url);//location of a request
}
```

Code that is not executed may be referred to as a non-critical path. In this embodiment of this application, the non-critical path may have the following several cases:

1. Function that is not executed, for example, foo_method2( ) and unused_method( ). Specifically, foo_method2( ) is not executed before fetch(url) is executed, and unused_method( ) is executed before fetch(url). However, after execution, an execution result is not used in subsequent code.

2. Statement that is not executed, for example, a statement in an entire else branch.

3. Variable that is not referenced after the foregoing code is simplified, for example, an unused variable. For instant, an IDE tool such as Intellij Idea may be used to check that a variable is not used by any function.

The tailoring module may select corresponding code from the source code based on the critical path sent by the analysis module, and then package the selected code to obtain the acceleration script. The acceleration script is used to obtain, through parsing, a URL of the data required for the first screen display of the quick application. In some embodiments, before packaging, the tailoring module may further obfuscate and compress the selected code, so that a size of the acceleration script is smaller.

Figure 5B:
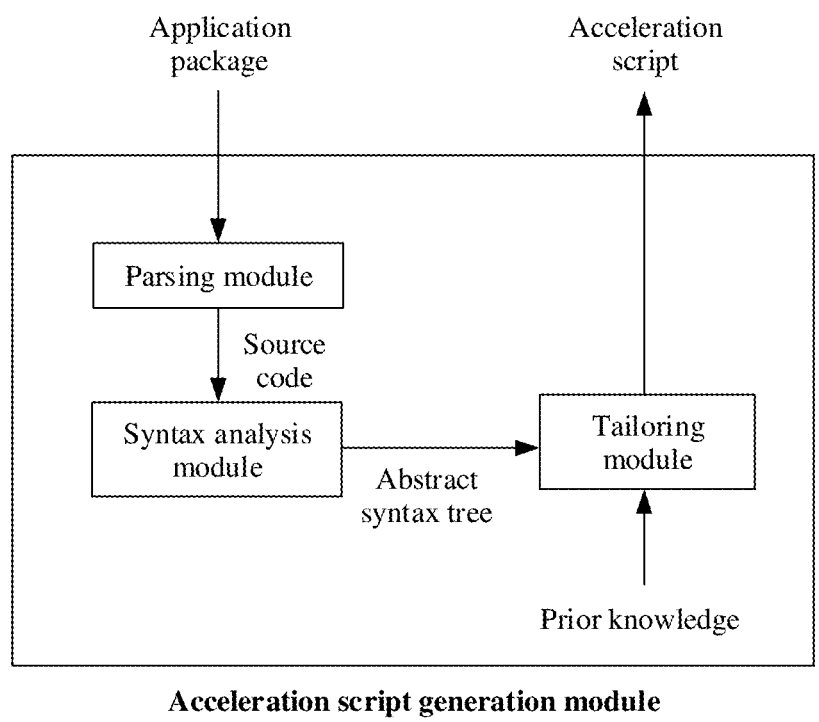
FIG. 5B is a block diagram of a software structure of another acceleration script generation module according to an embodiment of this application.

In a second manner, for the acceleration script generation module, refer to a block diagram of a software structure shown in FIG. 5B. The acceleration script generation module includes a parsing module, a syntax analysis module, and a tailoring module.

For the parsing module and the syntax analysis module, refer to the description in the foregoing content, and details are not described herein again.

The tailoring module is configured to tailor an abstract syntax tree based on prior knowledge in a manner of analyzing the abstract syntax tree, and then package tailored code to obtain the acceleration script. The prior knowledge is code content that is known in advance and that does not affect normal execution of an in-application request by the application package after deletion. For example, the prior knowledge may include cascading style sheets (cascading style sheets, CSS), a template (namely, a layout), application life cycle callbacks (for example, callbacks during onDestroy/onResume), interface code used only in these life cycles, and the like. Developers may preset prior knowledge. In some embodiments, before packaging, the tailoring module may further obfuscate and compress the tailored code, so that a size of the acceleration script is smaller.

In some embodiments, the acceleration script generation module is integrated into the development device 100. The acceleration script generation module may generate an acceleration script by using source code that is of a quick application and that is entered by a user.

In a first manner, the acceleration script generation module includes a selection module, a syntax analysis module, a code injection module, a trial running module, an analysis module, and a tailoring module. The selection module is configured to select, from the source code that is of the quick application and that is entered by the user, source code that is about first screen display and that is available when the quick application is started. For other remaining modules, refer to the description in the content described in the embodiment corresponding to FIG. 5A. Details are not described herein again.

In a second manner, the acceleration script generation module includes a selection module, a syntax analysis module, and a tailoring module. The selection module is configured to select, from the source code that is of the quick application and that is entered by the user, source code that is about first screen display and that is available when the quick application is started. For other remaining modules, refer to the description in the content described in the embodiment corresponding to FIG. 5B. Details are not described herein again. The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of the embodiments of this application.

What is claimed is:

1. A method, comprising:
sending, by an electronic device, a first request to an application server, wherein the first request indicates to the application server to send an acceleration script of one or more quick applications to the electronic device, wherein the electronic device is a user terminal device;
receiving, by the electronic device, the acceleration script of the one or more quick applications that is sent by the application server;
detecting, by the electronic device, a first operation corresponding to a target quick application;
in response to detecting the first operation, performing:
sending, by the electronic device, a second request to the application server, wherein the second request requests an application package of the target quick application; and
running, by the electronic device, an acceleration script of the target quick application to obtain a first uniform resource locator (URL), and obtaining first data from a third-party server based on the first URL, wherein the acceleration script of the target quick application is comprised in the acceleration script of the one or more quick applications, wherein running, by the electronic device, the acceleration script of the target quick application to obtain the first URL comprises:
obtaining, by the electronic device, device data based on the acceleration script of the target quick application, wherein the device data comprises one or more of a media access control (MAC) address of the electronic device, an engine version number of the electronic device, an Internet protocol (IP) address of the electronic device, an operating system version of the electronic device, address information of the electronic device, a network type of the electronic device, or a manufacturer brand of the electronic device; and
obtaining, by the electronic device, the first URL based on the acceleration script of the target quick application and the device data;
receiving, by the electronic device, the application package that is of the target quick application and that is sent by the application server;
running, by the electronic device, the application package of the target quick application to obtain a second URL; and
when the first URL is the same as the second URL, generating and displaying, by the electronic device, a first screen of the target quick application based on the first data, the first URL being the same as the second URL indicating that a correct URL of the first data required for the first screen of the target quick application can be obtained based on the acceleration script of the target quick application.

2. The method according to claim 1, further comprising:
before sending, by the electronic device, the first request to the application server, receiving, by the electronic device, instant messaging information that comprises identifiers of the one or more quick applications.

3. The method according to claim 1, further comprising:
before sending, by the electronic device, the first request to the application server, detecting, by the electronic device, a user operation performed on an icon of the one or more quick applications.

4. The method according to claim 1, further comprising:
before sending, by the electronic device, the first request to the application server, receiving, by the electronic device, entered quick application name information, wherein the entered quick application name information corresponds to the one or more quick applications.

5. The method according to claim 1, further comprising:
when the first URL is different from the second URL, obtaining, by the electronic device, second data from the third-party server based on the second URL; and
generating and displaying, by the electronic device, the first screen of the target quick application based on the second data.

6. The method according to claim 5, further comprising:
when the first URL is the same as the second URL, sending, by the electronic device to the application server, information indicating that the acceleration script of the target quick application is successfully hit; or
when the first URL is different from the second URL, sending, by the electronic device to the application server, information indicating that the acceleration script of the target quick application fails to be hit.

7. A non-transitory computer-readable storage medium, comprising instructions, wherein when the instructions are run on an electronic device, the electronic device is enabled to perform operations including:

sending a first request to an application server, wherein the first request indicates to the application server to send an acceleration script of one or more quick applications to the electronic device, wherein the electronic device is a user terminal device;

receiving the acceleration script that is of the one or more quick applications and that is sent by the application server;

detecting a first operation for a target quick application, and in response to the first operation, performing:

sending a second request to the application server, wherein the second request requests an application package of the target quick application; and running an acceleration script of the target quick application to obtain a first uniform resource locator (URL), and obtaining first data from a third-party server based on the first URL, wherein the acceleration script of the target quick application is comprised in the acceleration script of the one or more quick applications, wherein running the acceleration script of the target quick application to obtain the first URL comprises:

obtaining device data based on the acceleration script of the target quick application, wherein the device data comprises one or more of a media access control (MAC) address of the electronic device, an engine version number of the electronic device, an Internet protocol (IP) address of the electronic device, an operating system version of the electronic device, address information of the electronic device, a network type of the electronic device, or a manufacturer brand of the electronic device; and obtaining the first URL based on the acceleration script of the target quick application and the device data;

receiving the application package that is of the target quick application and that is sent by the application server;

running the application package of the target quick application to obtain a second URL; and when the first URL is the same as the second URL, generating and displaying a first screen of the target quick application based on the first data, the first URL being the same as the second URL indicating that a correct URL of the first data required for the first screen of the target quick application can be obtained based on the acceleration script of the target quick application.

8. A method, comprising:

receiving, by an application server, an application package of a quick application;

generating, by the application server, an acceleration script of the quick application based on the application package, wherein the acceleration script of the quick application is configured to be run by a first electronic device to cause the first electronic device to obtain a first uniform resource locator (URL) of data required for a first screen display of the quick application, wherein the first electronic device is a user terminal device;

receiving, by the application server, a first request sent by the first electronic device, wherein the first request indicates to the application server to send the acceleration script of the quick application to the first electronic device;

receiving, by the application server, a hit result that is of the acceleration script of the quick application and that is sent by one or more second electronic devices;

calculating, by the application server, a hit rate of the acceleration script of the quick application based on the hit result, the hit rate indicating a rate of first one or more URLs obtained from running the acceleration script of the quick application being the same as respective second one or more URLs obtained from running the application package of the quick application;

determining, by the application server, that the hit rate of the acceleration script of the quick application is not less than a preset value;

after determining, by the application server, that the hit rate of the acceleration script of the quick application is not less than the preset value, sending, by the application server, the acceleration script of the quick application to the first electronic device based on the first request;

receiving, by the application server, a second request sent by the first electronic device, wherein the second request requests the application package of the quick application; and sending, by the application server, the application package of the quick application to the first electronic device based on the second request, wherein the application package of the quick application is configured to be run by the first electronic device to cause the first electronic device to obtain a second URL, the first URL being the same as the second URL indicating that a correct URL of the data required for the first screen display of the quick application can be obtained based on the acceleration script of the quick application.

9. The method according to claim 8, wherein generating, by the application server, the acceleration script of the quick application based on the application package comprises:

parsing the application package to obtain first source code corresponding to the first screen display of the quick application;

parsing the first source code to obtain an abstract syntax tree;

injecting statistics upload code into one or more nodes of the abstract syntax tree to obtain second source code;

obtaining a processed application package based on the second source code;

running the processed application package to obtain a critical path indicated by the statistics upload code;

selecting third source code from the first source code based on the critical path; and obtaining the acceleration script of the quick application based on the third source code.

10. An electronic device, comprising:

one or more processors; and a non-transitory memory; and wherein the non-transitory memory is coupled to the one or more processors, the non-transitory memory is configured to store program code, and when the one or more processors invoke the program code, the electronic device is caused to perform operations including:

sending a first request to an application server, wherein the first request indicates to the application server to send an acceleration script of one or more quick applications to the electronic device, wherein the electronic device is a user terminal device;

receiving the acceleration script that is of the one or more quick applications and that is sent by the application server;

detecting a first operation for a target quick application, and in response to the first operation, performing:

sending a second request to the application server, wherein the second request requests an application package of the target quick application; and running an acceleration script of the target quick application to obtain a first uniform resource locator (URL), and obtaining first data from a third-party server based on the first URL, wherein the acceleration script of the target quick application is comprised in the acceleration script of the one or more quick applications;

receiving the application package that is of the target quick application and that is sent by the application server;

running the application package of the target quick application to obtain a second URL, wherein running the acceleration script of the target quick application to obtain the first URL comprises:

obtaining device data based on the acceleration script of the target quick application, wherein the device data comprises one or more of a media access control (MAC) address of the electronic device, an engine version number of the electronic device, an Internet protocol (IP) address of the electronic device, an operating system version of the electronic device, address information of the electronic device, a network type of the electronic device, or a manufacturer brand of the electronic device; and obtaining the first URL based on the acceleration script of the target quick application and the device data; and when the first URL is the same as the second URL, generating and displaying a first screen of the target quick application based on the first data, the first URL being the same as the second URL indicating that a correct URL of the first data required for the first screen of the target quick application can be obtained based on the acceleration script of the target quick application.

11. The electronic device according to claim 10, wherein when the one or more processors invoke the program code, the electronic device is caused to further perform the following operation:

receiving instant messaging information that comprises identifiers of the one or more quick applications.

12. The electronic device according to claim 10, wherein when the one or more processors invoke the program code, the electronic device is caused to further perform the following operation:

detecting a user operation performed on an icon of the one or more quick applications.

13. The electronic device according to claim 10, wherein when the one or more processors invoke the program code, the electronic device is caused to further perform the following operation:

receiving entered quick application name information, wherein the entered quick application name information corresponds to the one or more quick applications.

14. The electronic device according to claim 10, the operations further comprising:

when the first URL is different from the second URL, obtaining second data from the third-party server based on the second URL; and generating and displaying the first screen of the target quick application based on the second data.

15. The electronic device according to claim 10, the operations further comprising:

when the first URL is the same as the second URL, sending, to the application server, information indicating that the acceleration script of the target quick application is successfully hit; or when the first URL is different from the second URL, sending, to the application server, information indicating that the acceleration script of the target quick application fails to be hit.

16. An application server, comprising:

one or more processors; and a non-transitory memory; and wherein the non-transitory memory is coupled to the one or more processors, the non-transitory memory is configured to store program code, and when the one or more processors invoke the program code, the application server is caused to perform operations including:

receiving an application package of a quick application;

generating an acceleration script of the quick application based on the application package, wherein the acceleration script of the quick application is configured to be run by a first electronic device to cause the first electronic device to obtain a first uniform resource locator (URL) of data required for a first screen display of the quick application, wherein the first electronic device is a user terminal device;

receiving a first request sent by the first electronic device, wherein the first request indicates to the application server to send the acceleration script of the quick application to the first electronic device;

receiving a hit result that is of the acceleration script of the quick application and that is sent by one or more second electronic devices;

calculating a hit rate of the acceleration script of the quick application based on the hit result, the hit rate indicating a rate of first one or more URLs obtained from running the acceleration script of the quick application being the same as respective second one or more URLs obtained from running the application package of the quick application;

determining that the hit rate of the acceleration script of the quick application is not less than a preset value;

after determining that the hit rate of the acceleration script of the quick application is not less than the preset value, sending the acceleration script of the quick application to the first electronic device based on the first request;

receiving, a second request sent by the first electronic device, wherein the second request requests the application package of the quick application; and sending the application package of the quick application to the first electronic device based on the second request, wherein the application package of the quick application is configured to be run by the first electronic device to cause the first electronic device to obtain a second URL, the first URL being the same as the second URL indicating that a correct URL of the data required for the first screen display of the quick application can be obtained based on the acceleration script of the quick application.

17. The application server according to claim 16, the operations further comprising:
- parsing the application package to obtain first source code corresponding to the first screen display of the quick application;
- parsing the first source code to obtain an abstract syntax tree;
- injecting statistics upload code into one or more nodes of the abstract syntax tree to obtain second source code;
- obtaining a processed application package based on the second source code;
- running the processed application package to obtain a critical path indicated by the statistics upload code;
- selecting third source code from the first source code based on the critical path; and
- obtaining the acceleration script of the quick application based on the third source code.

\* \* \* \* \*